(12) United States Patent
Momoda et al.

(10) Patent No.: US 8,529,789 B2
(45) Date of Patent: *Sep. 10, 2013

(54) CURABLE COMPOSITION

(75) Inventors: Junji Momoda, Tokuyama (JP);
Takayoshi Kawasaki, Tokuyama (JP);
Toshiaki Ohtani, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/171,272

(22) Filed: Jul. 1, 2005

(65) Prior Publication Data

US 2005/0263745 A1 Dec. 1, 2005

Related U.S. Application Data

(63) Continuation of application No. 09/787,395, filed as application No. PCT/JP00/04819 on Jul. 18, 2000, now abandoned.

(30) Foreign Application Priority Data

Jul. 19, 1999 (JP) .................... 99-205165
Oct. 18, 1999 (JP) .................... 99-295835

(51) Int. Cl.
| | | |
|---|---|---|
| C08F 220/28 | (2006.01) |
| C08F 220/32 | (2006.01) |
| C08F 220/12 | (2006.01) |
| C08F 220/14 | (2006.01) |
| C08K 5/06 | (2006.01) |
| C08L 33/08 | (2006.01) |
| C08L 33/10 | (2006.01) |
| C08L 33/14 | (2006.01) |
| C08L 33/16 | (2006.01) |
| C09K 3/00 | (2006.01) |

(52) U.S. Cl.
USPC ........ 252/183.11; 524/96; 524/110; 526/266; 526/286; 526/292.7; 526/313; 526/320

(58) Field of Classification Search
None
See application file for complete search history.

(56) References Cited

U.S. PATENT DOCUMENTS

| | | | |
|---|---|---|---|
| 6,194,511 B1 * | 2/2001 | Momoda et al. | 524/539 |
| 6,802,993 B2 * | 10/2004 | Momoda et al. | 252/586 |
| 8,012,596 B2 * | 9/2011 | Takenaka et al. | 428/522 |

FOREIGN PATENT DOCUMENTS

| | | | |
|---|---|---|---|
| EP | 940694 A1 | * | 9/1999 |
| JP | 04-202309 A | * | 7/1992 |
| JP | 05-034649 A | * | 2/1993 |
| JP | 06-220247 A | * | 8/1994 |
| JP | 10-338869 A | * | 12/1998 |

* cited by examiner

*Primary Examiner* — Robert Sellers
(74) *Attorney, Agent, or Firm* — Rankin, Hill & Clark LLP

(57) ABSTRACT

A photochromic cured product exhibiting favorable photochromic properties such as a high color density and a large fading rate, and excellent base member properties such as a high hardness, a high heat resistance and a high impact resistance. A curable composition contains a polymerizable monomer which exhibits the L-scale Rockwell hardness of not larger than 40, a bifunctional polymerizable monomer which exhibits the L-scale Rockwell hardness of not smaller than 60, a polyfunctional polymerizable monomer which exhibits the L-scale Rockwell hardness of not smaller than 60, and a photochromic compound.

15 Claims, No Drawings

CURABLE COMPOSITION

This application is a continuation application of U.S. Ser. No. 09/787,395, filed Mar. 19, 2001.

TECHNICAL FIELD

The present invention relates to a novel photochromic cured product having excellent photochromic properties and matrix characteristics, and to a curable composition that yields the cured product.

BACKGROUND ART

Photochromism is a phenomenon that is drawing attention in these several years, and is a reversible action of a compound which quickly changes its color when it is irradiated with light containing ultraviolet rays such as sunlight or light of a fluorescent lamp and resumes its initial color when it is no longer irradiated with light but is placed in a dark place. The compound having this property is called photochromic compound. Various compounds have so far been synthesized but no particular common nature is recognized in their structures.

The present inventors have forwarded the study concerning a series of photochromic compounds, have succeeded in synthesizing novel photochromic compounds such as fulgimide compounds, spirooxazine compounds and chromene compounds, have discovered that these compounds exhibit excellent photochromic properties, and have already proposed these compounds.

Through the study conducted by the present inventors up to now, it has been learned that the photochromic properties such as color density and fading rate of the photochromic compound are exhibited considerably sluggishly in the polymer as compared in a solution. This phenomenon becomes conspicuous particularly in a compound having photochromic molecules of large sizes. The development of this phenomenon is attributed to that free space in which the photochromic compound molecules are allowed to freely move is very limited in a matrix of polymer compared to that of in a solution.

In order to solve the above-mentioned problem, it can be contrived to make the base member soft by lowering the glass transition temperature of polymer of the matrix or to broaden free space in the matrix.

However, when a matrix having a low glass transition temperature is simply used, hardness is lost bringing about a problem when the composition is used for the applications where a hardness is required, such as lenses. Further, when polymer having large free space is used as a matrix, the hardness of the polymer is usually much dependent upon the temperature. Even those that exhibit a relatively high hardness near room temperature show a rapidly dropped hardness at high temperatures (hereinafter also referred to as having a low heat resistance) and further show a decreased impact resistance.

U.S. Pat. No. 5,395,566 teaches that the use of a polymerizable monomer having an epoxy group in combination with a photochromic compound, helps improve light resistance for the photochromic properties. The above technology, however, does not at all teach the use of a polyfunctional monomer in combination with a difunctional monomer which, when homopolymerized, exhibits an L-scale Rockwell hardness of not smaller than 60, in addition to using the above polymerizable monomer having an epoxy group. Therefore, the cured product that is obtained has a low hardness and poor impact resistance.

The specification of U.S. Pat. No. 5,739,243 teaches a system of a combination of a particular long-chain alkylene glycol dimethacrylate and a polyfunctional methacrylate having three or more radically polymerizable groups. From this combination is obtained a cured product having improved color density and fading rate. However, this technology is for obtaining a matrix excellent in flexibility. With this combination as shown in working examples, the matrix has such problems as a decreased hardness, a decreased heat resistance and much optical distortion.

Further, the specification of U.S. Pat. No. 5,811,503 discloses a system of a combination of a long-chain alkylene glycol dimethacrylate, a dimethacrylate, and a polyfunctional methacrylate having three or more radically polymerizable groups. Though improved color-developing rate and fading rate are exhibited, this combination, too, has such defects that the matrix exhibits a decreased hardness, a decreased heat resistance and much optical distortion.

The specification of PCT International Patent Application 97/03373 discloses a combination of a dimethacrylate with bisphenol A as a skeleton, a monofunctional styrene and a long-chain alkyl monofunctional methacrylate. However, this combination, too, has such defects that the matrix exhibits decreased hardness, a decreased heat resistance and much optical distortion.

The specification of U.S. Pat. No. 5,708,064 teaches the use of a particular polymerizable monomer for imparting a large refractive index to a polymer in combination with a particular polymerizable monomer rich in flexibility. In this technology, however, examples of the polymerizable monomer for imparting a large refractive index are monofunctional monomers or those, which when homopolymerized, exhibit an L-scale Rockwell hardness of smaller than 60, such as bisphenol A bismethacrylate, phenoxyethylmethacrylate, styrene, and α-methyl styrene, from which cured products having a high hardness cannot be obtained. Concerning the particular system of the above combination, the above technology does not, either, disclose the use of a polyfunctional polymerizable monomer that satisfies the requirement of L-scale Rockwell hardness of not smaller than 60 degrees. Thus, this technology, too, teaches a cured product having a low hardness, an inferior heat resistance and an inferior impact resistance.

As described above, no compound is ever satisfying both photochromic properties and matrix properties.

DISCLOSURE OF THE INVENTION

It is therefore an object of the present invention to provide a photochromic cured product exhibiting excellent photochromic properties such as a high color density and a large fading rate, and exhibiting excellent matrix characteristics such as a high hardness and a high heat resistance.

The present invention was proposed in order to achieve the above object and was completed based on a knowledge that a cured product obtained by curing a curable composition obtained by mixing a photochromic compound with a combination of polymerizable monomers of particular hardnesses, exhibits excellent photochromic properties such as a high color density and a large fading rate, as well as excellent matrix properties in regard to hardness and heat resistance.

That is, the present invention is concerned with a curable composition which, when cured, exhibits an L-scale Rockwell hardness of not smaller than 65, comprising:
A) a polymerizable monomer which, when homopolymerized, exhibits the L-scale Rockwell hardness of not larger than 40;

B) a polyfunctional polymerizable monomer which is trifunctional or more highly functional and which, when homopolymerized, exhibits the L-scale Rockwell hardness of not smaller than 60;
C) a difunctional polymerizable monomer which, when homopolymerized, exhibits the L-scale Rockwell hardness of not smaller than 60; and
D) a photochromic compound.

The invention is further concerned with a photochromic cured product obtained by curing the above curable composition.

BEST MODE FOR CARRYING OUT THE INVENTION

A polymerizable monomer (hereinafter also simply referred to as "low-hardness monomer") which is used for the curable composition of the invention and which, when homopolymerized, exhibits an L-scale Rockwell hardness of not larger than 40, may be any known polymerizable monomer without any particular limitation provided a homopolymer obtained by the homopolymerization exhibits the L-scale Rockwell hardness of not larger than 40. Use of this low-hardness monomer makes it possible to obtain a cured product that exhibits excellent photochromic properties such as a high color density and a large fading rate. From the standpoint of obtaining more excellent photochromic properties, it is desired that the low-hardness monomer has the L-scale rockwell hardness of not larger than 35.

Here, the polymerizable group may be any group without any limitation provided it exhibits polymerizable property, such as epoxy group. Preferably, however, there is used a group that exhibits radically polymerizing property. Examples of the radically polymerizable group may be methacryloyl group, acryloyl group, vinyl group and allyl group. Among them, methacryloyl group and acryloyl group are particularly preferred.

The L-scale Rockwell hardness stands for a hardness measured in compliance with JIS-B7726. That is, the homopolymers of the monomers are measured to easily judge whether the above hardness condition is satisfied. Concretely speaking, as will be described in Examples appearing later, the monomer is polymerized to obtain a cured product having a thickness of 2 mm, which is, then, preserved in a room maintained at 25° C. for one day and is, then, measured for its L-scale Rockwell hardness by using a Rockwell hardness meter.

The polymer which is measured for its L-scale Rockwell hardness is obtained by the cast polymerization under a condition in which not less than 90 mol % (polymerization ratio of not smaller than 90%) and, preferably, not less than 95 mol % of the monomer that is fed is polymerized. By using a radically polymerizable monomer which, when homopolymerized at the above polymerization ratio, satisfies the above L-scale Rockwell hardness, the cured product obtained by the present invention exhibits excellent photochromic properties concerning the color density and the fading rate.

A) Low-Hardness Monomers:

As the monomers that can be favorably used as low-hardness monomers, there can be preferably used polymerizable monomers that belong to the compounds (I) to (VI) described below and that satisfy the requirements of the L-scale Rockwell hardness of the homopolymer. The polymerizable monomers may be used in two or more kinds in combination as a mixture.

(I) An ethylenic monofunctional unsaturated monomer (hereinafter also simply referred to as "low-hardness monomer 1").
(II) A polyalkylene glycol polymerizable monomer or polyalkylenethiol glycol polymerizable monomer (hereinafter also simply referred to as "low-hardness monomer 2") of which either a hydroxyl group or a mercapto group at the terminal is substituted by methacryloyloxy group, acryloyloxy group, vinylbenzyloxy group, isopropenylbenzyloxy group, vinylbenzylcarbamoyl group, isopropenylbenzylcarbamoyl group or vinyloxy group, and of which other group is not substituted or is substituted by methacryloyloxy group, acryloyloxy group, alkyloxy group, alkoxyalkyloxy group, aryloxy group, acyloxy group, alkyloxy group having an epoxy group at the terminal thereof, haloalkyloxy group or oleyloxy group.
(III) A substituted or unsubstituted alkylacrylate, or a substituted or unsubstituted long-chain alkylmethacrylate (hereinafter also simply referred to as "low-hardness monomer 3").
(IV) A hydrocarbon chain (meth)acrylate having an unsaturated bond (hereinafter also simply referred to as "low-hardness monomer 4").
(V) A compound having at least one epoxy group in the molecule but without a radically polymerizable group in the molecule (hereinafter also simply referred to as "low-hardness monomer 5").
(VI) A compound having at least one thioepoxy group in the molecule but without a radically polymerizable group in the molecule (hereinafter also simply referred to as "low-hardness monomer 6").

Among them, it is preferred to use the low-hardness monomer 2, low-hardness monomer 3 and low-hardness monomer 4.

The low-hardness monomer 1 is a monomer having one ethylenically unsaturated group as a polymerizable group. Here, the ethylenically unsaturated group will be vinyl group, styryl group or allyl group. Concrete examples of the low-hardness monomer 1 include vinyl acetate, vinyl caproate, vinyl laurate, vinyl stearate, vinyl adipate, and polyethylene glycol vinyl ether.

The low-hardness monomer 2 is the one in which either a hydroxyl group or a mercapto group at a terminal of polyalkylene glycol or polyalkylenethiol glycol is substituted by methacryloyloxy group, acryloyloxy group, vinylbenzyloxy group, isopropenylbenzyloxy group, vinylbenzylcarbamoyl group, isopropenylbenzylcarbamoyl group or vinyloxy group (i.e., a structure terminated by the dehydration-condensation with methacrylic acid or acrylic acid), and the other group is not substituted or is substituted by methacryloyloxy group, acryloyloxy group, alkyloxy group, alkoxyalkyloxy group, aryloxy group, acyloxy group, alkyloxy group having an epoxy group at the terminal, haloalkyloxy group or oleyloxy group.

Concretely, there is exemplified a monomer having a structure represented by the following general formula (1),

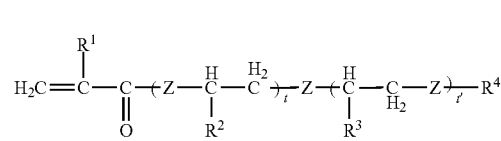

(1)

wherein $R^1$, $R^2$ and $R^3$ are, independently from each other, hydrogen atoms or alkyl groups having 1 to 2 carbon atoms, $R^4$ is a hydrogen atom, an alkyl group, an alkoxyalkyl group, an aryl group, an acyl group, an alkyl group having an epoxy group at the terminal, a methacryloyl group, an acryloyl group, a haloalkyl group or an oleyl group, Z is an oxygen atom or a sulfur atom, t and t' are, independently from each other, 0 to 70 in average, t+t' is 7 to 70 when $R^1$ is an alkyl group and $R^4$ is a methacryloyl group, t+t' is 4 to 70 when $R^1$ is an alkyl group and $R^4$ is a group other than the methacryloyl group and acryloyl group, and t+t' is 1 to 70 when $R^1$ is a hydrogen atom.

The monomer represented by the above general formula is usually obtained in the form of a mixture of molecules having different molecular weights. Therefore, t and t'' representing the numbers of the alkylene oxide units in the above formula (1), are expressing average numbers of the units in the whole mixture. Here, t and t' are, independently from each other, 0 to 70 in average. When t' is 0, the alkylene oxide unit is of a single kind. When t' is other than 0, there are represented alkylene oxide units of different kinds recurring in a unit of a block.

Relying upon this expression, it is desired that t+t' is 7 to 12 and, particularly, 8 to 10 in average when $R^1$ is an alkyl group and $R^4$ is a methacryloyl group, it is desired that t+t' is 4 to 40 and, particularly, 6 to 23 when $R^1$ is an alkyl group and $R^4$ is a group other than the methacryloyl group and the acryloyl group, and it is desired that t+t' is 1 to 25 and, particularly, 1 to 10 in average when $R^1$ is a hydrogen atom, from the standpoint of further increasing the fading rate which is one of the photochromic properties and in imparting a particularly good result to the moldability of lenses.

As the alkyl group denoted by $R^4$, there can be exemplified methyl group, ethyl group, butyl group, heptyl group, nonyl group, lauryl group and stearyl group having 1 to 25 carbon atoms and, preferably, 1 to 20 carbon atoms. As the alkoxyalkyl group, there can be exemplified methoxyethyl group, butoxyethyl group, methoxynonyl group, methoxylauryl group and methoxystearyl group having 1 to 25 carbon groups and, preferably, 1 to 20 carbon atoms. As the aryl group, there can be exemplified phenyl group and naphthyl group having 6 to 14 carbon atoms. As the acyl group, there can be exemplified acetyl group, propionyl group, butylonyl group and benzoyl group having 1 to 26 carbon atoms and, preferably, 1 to 21 carbon atoms. As the alkyl group having an epoxy group at the terminal, there can be exemplified a glycidyl group of which the terminal exemplified as the alkyl group is epoxylated. As the haloalkyl group, there can be exemplified chloromethyl group, bromomethyl group, trifluoromethyl group and perfluoroheptyl group having 1 to 25 carbon atoms and, preferably, 1 to 20 carbon atoms.

Among them, it is particularly desired that $R^1$ in the general formula (1) is a hydrogen atom (acryloyl group) from the standpoint of obtaining a cured product having excellent photochromic properties such as color density and fading rate. It is further desired that $R^1$ in the general formula (1) is a hydrogen atom and $R^4$ is an acryloyl group from the standpoint of obtaining a cured product having good strength.

On the other hand, when $R^1$ in the general formula (1) is an alkyl group, it is desired that $R^4$ is alkyl group, alkoxyalkyl group, acyl group, aryl group, alkyl group having an epoxy group at the terminal, haloalkyl group or oleyl group.

It is further desired that $R^2$ and $R^3$ are hydrogen atoms.

As the low-hardness monomer 2 of the present invention, there can be exemplified a monomer having a structure represented by the following general formula (2),

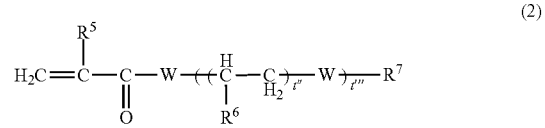

wherein $R^5$ and $R^6$ are the same as $R^1$, $R^2$ and $R^3$ described above, $R^7$ is the same as $R^4$ described above, W is the same as Z described above, t'' is an integer of 2 to 8, t''' is 7 to 40 when $R^5$ is an alkyl group and $R^7$ is a methacryloyl group, t''' is 4 to 40 when $R^5$ is an alkyl group and $R^7$ is a group other than the methacryloyl group and the acryloyl group, and t''' is 1 to 40 when $R^5$ is a hydrogen atom.

Here, t''' represents an average number of the alkylene oxide units in the whole mixture like t and t' in the abovementioned formula (1).

In the general formula (2), it is desired that t''' is 7 to 12 and, particularly, 8 to 10 in average when $R^5$ is an alkyl group and $R^7$ is a methacryloyl group, it is desired that t''' is 4 to 40 and, particularly, 6 to 23 when $R^5$ is an alkyl group and $R^7$ is a group other than the methacryloyl group and the acryloyl group, and it is desired that t''' is 1 to 25 and particularly, 1 to 10 when $R^1$ is a hydrogen atom, from the standpoint of further improving the fading rate which is one of the photochromic properties and in imparting a particularly good result to the moldability of lenses.

In the general formula (2), further, it is particularly desired that t'' representing the number of the alkylene units is 2 to 6.

Among them, it is desired that a relationship between $R^5$ and $R^7$ in the general formula (2) becomes the same as a relationship between $R^1$ and $R^4$ in the general formula (2).

Concrete examples of the low-hardness monomer 2 include a polyethylene glycol methacrylate (t=10, t'=0) having an average molecular weight of 526, a polyethylene glycol methacrylate (t=6, t'=0) having an average molecular weight of 360, a methyl ether polyethylene glycol methacrylate (t=9, t'=0) having an average molecular weight of 496, a methyl ether polyethylene glycol methacrylate (t=20, t'=0) having an average molecular weight of 1000, a polypropylene glycol methacrylate (t=5, t'=0) having an average molecular weight of 375, a polypropylene glycol methacrylate (t=6, t'=0) having an average molecular weight of 430, a polypropylene glycol methacrylate (t=9, t'=0) having an average molecular weight of 622, a methyl ether polypropylene glycol methacrylate (t=9, t'=0) having an average molecular weight of 620, a methyl ether polyethylene glycol polypropylene glycol methacrylate (t=6, t'=4) having an average molecular weight of 596, a polytetramethylene glycol methacrylate (t=7, t'=0) having an average molecular weight of 566, an octylphenyl ether polyethylene glycol methacrylate (t=40, t'=0) having an average molecular weight of 2034, a nonyl ether polyethylene glycol methacrylate (t=9, t'=0) having an average molecular weight of 610, a methoxyethyl acrylate (t=1, t'=0), a methyl ether polyethylene glycol acrylate (t=4, t'=0) having an average molecular weight of 262, a methyl ether polyethylene glycol acrylate (t=9, t'=0) having an average molecular weight of 482, a methyl ether polyethylene glycol polypropylene glycol acrylate (t=6, t'=4) having an average molecular weight of 582, a methylthio ether polyethylenethio glycol methacrylate (t=7, t'=0) having an average molecular weight of 640, a perfluoroheptylethylene glycol methacrylate (t=4, t'=0) having an average molecular weight of 630, a glycidyl polyethylene glycol methacrylate (t=9, t'=0) having an average molecular weight of 538, an acetyloxyethyl acrylate (t=1, t'=0), a phenoxyethyl acrylate (t=1, t'=0), a benzyloxyethyl acrylate (t=1, t'=0), an acetylpolyethylene glycol methacrylate (t=9, t'=0) having an average molecular weight of 524, a butylylpolyethylene glycol methacrylate (t=9, t'=0) having an average molecular weight of 566, a benzoylpolyethylene glycol methacrylate (t=9, t'=0) having an average molecular weight of 586, a nonylbenzoylpolyethylene glycol methacrylate (t=9, t'=0) having an average molecular weight of 689, a butoxymethyl ether polyethylene glycol methacrylate (t=9, t'=0) having an average molecular weight of 568, a polyethylene glycol dimethacrylate (t=16, t'=0) having an average molecular weight of 875, a polytetramethylene glycol dimethacrylate (t=7, t'=0) having an average molecular weight of 650, a polytetramethylene glycol dimethacrylate (t=17, t'=0) having an average molecular weight of 1400, a polypropylene glycol dimethacrylate (t=7, t'=0) having an average molecular weight of 560, a polyethylene glycol diacrylate (t=2, t'=0) having an average molecular weight of 214, a polyethylene glycol diacrylate (t=3, t'=0) having an average molecular weight of 258, a polyethylene glycol diacrylate (t=4, t'=0) having an average molecular weight of 302, a polyethylene glycol diacrylate (t=9, t'=0) having an average molecular weight of 522, a polyethylene glycol methacrylate acrylate (t=3, t'=0) having an average molecular weight of 272, and a polyethylene glycol methacrylate acrylate (t=9, t'=0) having an average molecular weight of 536.

The low-hardness monomer 3 is an acrylate having a substituted or nonsubstituted alkyl group, or is a methacrylate having a substituted or unsubstituted long-chain alkyl group, and is represented by, for example, the following general formula (3),

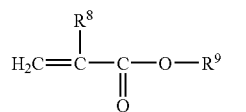

(3)

wherein $R^8$ is a hydrogen atom or a methyl group, and when $R^8$ is a hydrogen atom, $R^9$ is a substituted or unsubstituted alkyl group having 1 to 40 carbon atoms and when $R^8$ is a methyl group, $R^9$ is a substituted or unsubstituted alkyl group having 8 to 40 carbon atoms.

Here, examples of the substituted alkyl group denoted by $R^9$ include haloalkyl groups such as chloromethyl group, chloroethyl group, fluoromethyl group and perfluoroheptyl group; alkyl groups having an epoxy group at the terminal, such as glycidyl group, etc.; and alkoxyalkyl groups such as methoxymethyl group, ethoxymethyl group and ethoxyethyl group.

Among these alkyl acrylates or long-chain alkyl methacrylates, it is desired to use those in which, when $R^8$ in the above formula is a hydrogen atom, $R^9$ is a substituted or unsubstituted alkyl group having 1 to 20 carbon atoms and, when $R^8$ is a methyl group, $R^9$ is a substituted or unsubstituted alkyl group having 8 to 25 carbon atoms, from the standpoint of easy availability of the starting material. It is further desired that $R^8$ is a hydrogen atom from the standpoint of obtaining a cured product having excellent photochromic properties such as color density and fading rate.

Concrete examples of the compound include stearyl methacrylate, lauryl methacrylate, methyl acrylate, ethyl acrylate, butyl acrylate, octyl acrylate, lauryl acrylate and glycidyl acrylate.

As the low-hardness monomer 4, there can be used, without any particular limitation, any hydrocarbon chain (meth)acrylate having an unsaturated bond in the hydrocarbon chain like a (meth)acrylate having 6 to 25 carbon atoms, such as oleyl methacrylate, nerol methacrylate, geraniol methacrylate, linalool methacrylate, and farnesol methacrylate.

As the compound having at least one epoxy group in the molecule but without having radically polymerizable group in the molecule, which is the low-hardness monomer 5, there can be exemplified (i) a reaction product of an alcoholic hydroxyl group-containing compound such as monohydric, dihydric or trihydric alcohol or a phenolic hydroxyl group-containing compound such as phenol or hydroquinone with epichlorohydrin, and (ii) a reaction product of a carboxylic acid such as benzoic acid or terephthalic acid with epichlorohydrin. Concrete examples of the above compound include ethylene glycol diglycidyl ether, propylene glycol diglycidyl ether, polyethylene glycol diglycidyl ether, glycerol polyglycidyl ether, diglycerol polyglycidyl ether, sorbitol polyglycidyl ether, polyethylene glycol diglycidyl ether, polypropylene glycol diglycidylether, and bisphenol A or propylene oxide adduct of a hydrogenated bisphenol A.

As the compound having at least one thioepoxy group in the molecule but without radically polymerizable group in the molecule, which is the low-hardness monomer 6, there can be exemplified (i) a reaction product of a thiolic hydroxyl group-containing compound such as a monohydric, dihydric or trihydric thiol or a thiophenolic hydroxyl group containing compound such as thiophenol or a thiohydroquinone with a thioepichlorohydrin, and (ii) a reaction product of a thiocarboxylic acid such as thiobenzoic acid or thioterephthalic acid with a thioepichlorohydrin. Concrete examples of the above compound include ethylenethio glycol thioglycidyl ether, propylenethio glycol thioglycidyl ether, thioglycerol polythioglycidyl ether, thioglycerol polythioglycidyl ether, thiosorbitol thioglycidyl ether, polyethylenethio glycol thioglycidyl ether, polypropylenethio glycol thioglycidyl ether, and thiopropylene oxide adduct of a thiobispenol A or a hydrogenated thiobisphenol A.

The curable composition of the present invention contains the above-mentioned low-hardness monomers as well as a difunctional and polyfunctional polymerizable monomers (hereinafter also referred to as "high-hardness monomers") which, when homopolymerized, exhibits an L-scale Rockwell hardness of not smaller than 60. The cured product obtained therefrom exhibits excellent basic properties such as hardness and heat resistance yet maintaining excellent photochromic properties such as color-developing rate and fading rate. The method of confirming the L-scale Rockwell hardness is the same as the one for the low-hardness monomers described above.

Any polymerizable group can be used without limitation provided it exhibits polymerizing property, and a group that exhibits radically polymerizable property is preferably used, such as methacryloyl group, acryloyl group, vinyl group and allyl group. Among them, methacryloyl group and acryloyl group are particularly preferred.

B) High-Hardness Monomer 1:

Among the high-hardness monomers, a polyfunctional polymerizable monomer which is trifunctional or more highly functional (hereinafter also referred to simply as "high-hardness monomer 1") which, when homopolymerized, exhibits an L-scale Rockwell hardness of not smaller than 60, may be any polymerizable monomer having not less than three polymerizable groups in the molecules and which, when homopolymerized into a homopolymer, exhibits the L-scale Rockwell hardness of not smaller than 60. Desirably, there is used a polymerizable monomer having 3 to 6 polymerizable groups from the standpoint of easy availability on an industrial scale.

By using the high-hardness monomer 1, the cured product that is obtained exhibits markedly improved matrix characteristics such as hardness and heat resistance. In order for the above effect to be markedly exhibited, it is desired to use the high-hardness monomer 1 that exhibits the L-scale Rockwell hardness of 80 to 130.

Preferred examples of the high-hardness monomer 1 include trimethacrylate derivative, triacrylate derivative, tetramethacrylate derivative, tetraacrylate derivative, triisocyanate derivative, tetraisocyanate derivative, triol derivative, trithiol derivative, tetrathiol derivative, triepoxy derivative, triurethane methacrylate derivative, tetraurethane methacrylate derivative, hexaurethane methacrylate derivative, trivinyl derivative, tetravinyl derivative and triallyl derivative. Among them, there can be preferably used trimethacrylate derivative, triarylate derivative, tetramethacrylate derivative, tetraacrylate derivative, triurethane methacrylate derivative, tetraurethane methacrylate derivative and hexaurethane methacrylate derivative having a methacryloyl group or an acryloyl group.

Among them, it is particularly desired to use a polyfunctional polymerizable monomer represented by the following general formula (4),

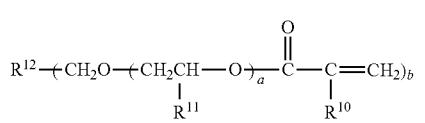

wherein $R^{10}$ and $R^{11}$ are, independently from each other, hydrogen atoms or alkyl groups (i.e., methyl groups or ethyl groups) having 1 to 2 carbon atoms, $R^{12}$ is a trivalent to hexavalent organic residue, a is 0 to 3 in average, and b is an integer of 3 to 6, from the standpoint of easy availability of the starting material and easiness for adjusting the hardness of the cured product.

In the above general formula, $R^{12}$ is a trivalent or hexavalent organic residue. Concrete examples include a group derived from polyol and an organic group including a trivalent to hexavalent hydrocarbon group or an urethane bond.

Concrete examples of the polyfunctional radically polymerizable monomer represented by the above general formula (4) that can be favorably used include a trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropanetriethylene glycol trimethacrylate, trimethylolpropanetriethylene glycol triacrylate, ethoxylated pentaerythritol tetraacrylate, ethoxylated pentaerythritol tetramethacrylate, pentaerythritol trimethacrylate, pentaerythritol tetramethacrylate, triurethaneoligomer tetraacrylate and urethaneoligomer hexamethacrylate. These polyfunctional polymerizable monomers may be used being mixed together in two or more kinds.

C) High-Hardness Monomer 2:

Among the high-hardness monomers, the difunctional polymerizable monomer (hereinafter also referred to simply as "high-hardness monomer 2") which, when homopolymerized, exhibits the L-scale Rockwell hardness of not smaller than 60, may be any known polymerizable monomer having two polymerizable groups in the molecules and which, when homopolymerized into a homopolymer, exhibits the L-scale Rockwell hardness of not smaller than 60.

The high-hardness monomer 2 imparts impact resistance to the cured product that is obtained and works to favorably exhibit photochromic properties such as fading rate maintaining good balance. From the standpoint of exhibiting the above effect to a conspicuous degree, it is desired that the low-hardness monomer 2 has the L-scale Rockwell hardness of 65 to 120.

As the difunctional polymerizable monomer that can be favorably used, there can be exemplified dimethacrylate derivative, diacrylate derivative, divinyl derivative, diallyl derivative, dicyano derivative, diol derivative, dithiol derivative, urethane dimethacrylate derivative, urethane diacrylate derivative, and diepoxy derivative. Among them, there can be exemplified dimethacrylate derivative, diacrylate derivative, urethane dimethacrylate derivative and urethane diacrylate derivative having a methacryloyl group or an acryloyl group, as well as divinyl derivative having a divinyl group.

Among them, it is desired to use the compounds represented by the compounds of the following general formulas (5) to (8), divinylbenzene and divinylbiphenyl from the standpoint of easy availability of the starting materials and easily adjusting the hardness. From the standpoint of favorably accomplishing the object of the present invention, it is particularly desired to use the compounds represented by the general formulas (5) to (8).

A compound represented by the general formula (5),

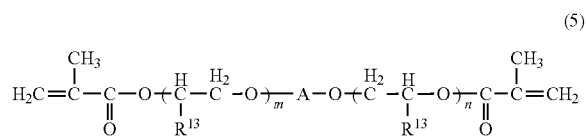

wherein $R^{13}$ and $R^{14}$ are, independently from each other, hydrogen atoms or alkyl groups having 1 to 2 carbon atoms, A is a straight-chain or branched-chain alkylene group, a substituted or unsubstituted phenylene group, a group represented by the following formula,

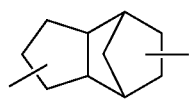

or a group represented by the following formula,

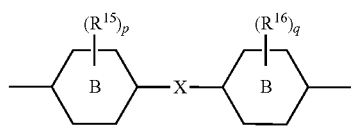

wherein $R^{15}$ and $R^{16}$ are, independently from each other, alkyl groups having 1 to 4 carbon atoms, chlorine atoms or bromine atoms, p and q are, independently from each other, integers of 0 to 4, a ring represented by the following formula

is a benzene ring or a cyclohexane ring, and when the ring represented by the following formula

is a benzene ring, X is any one of the groups represented by the following formulas

O,

S,

—S(O$_2$)—,

—C(O)—,

—CH$_2$—,

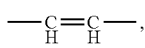

—C(CH$_3$)$_2$—,

—(CH$_3$)(C$_6$H$_5$)—, or a group represented by the formula

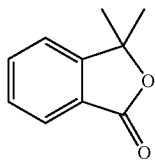

and when the ring represented by the following formula

is a cyclohexane ring, X is any one of the groups represented by the following formulas

O,

S,

—CH$_2$—,

—(CH$_3$)$_2$—, and m and n are not smaller than 1, respectively, and m+n is 2 to 6 in average.

In the above general formula (5), a straight-chain or branched alkylene group denoted by A will preferably be ethylene group, propylene group, butylene group, neopentylene group, hexylene group or nonylene group having 2 to 9 carbon atoms. As a substituent for the phenylene group denoted by A, there can be exemplified alkyl group (i.e., methyl group, ethyl group, propyl group, butyl group or the like group) having 1 to 4 carbon atoms, chlorine atoms or bromine atoms.

The difunctional polymerizable monomer represented by the above general formula (5) is usually obtained in the form of a mixture of molecules having different m and n. In the above formula, therefore, m and n represent values in average.

A compound represented by the following general formula (6),

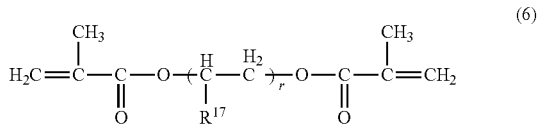

wherein R$^{17}$ is a hydrogen atom or an alkyl group having 1 to 2 carbon atoms, and r is 1 to 6 in average.

In the difunctional polymerizable monomer represented by the above general formula (6), too, r represents a value in average.

Concrete example of the difunctional polymerizable monomer represented by the above formula (5) or the formula (6) include diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, bisphenol A dimethacrylate, 2,2-bis(4-methacryloyloxyethoxyphenyl)propane, 2,2-bis(3,5-dibromo-4-methacryloyloxyethoxyphenyl)propane, 1,4-butylene glycol ethylenedimethacrylate, 1,9-nonylene glycol dimethacrylate, neopentylene glycol dimethacrylate, and bis(2-methacryloyloxyethylthioethyl)sulfide.

A compound represented by the following general formula (7),

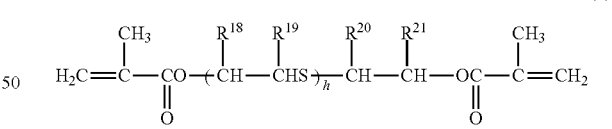

wherein R$^{18}$, R$^{19}$, R$^{20}$ and R$^{21}$ are the same or different, and are hydrogen atoms or methyl groups, and h is an integer of 1 to 10.

Concrete examples of the difunctional polymerizable monomer of the above formula (7) include bis(methacryloyloxyethyl)sulfide, bis(acryloyloxyethyl)sulfide, 1,2-(methacryloyloxyethylthio)ethane, 1,2-(bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, and 1,2-bis(acryloyloxyisopropylthioisopropyl)sulfide.

A compound represented by the following general formula (8),

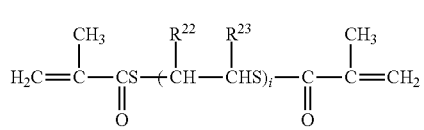

wherein $R^{22}$ and $R^{23}$ are the same or different, and are hydrogen atoms or methyl groups, and i is an integer of 1 to 10.

Concrete examples of the difunctional polymerizable monomer of the above formula (8) include 1,2-bis(methacryloylthio)ethane, bis(2-methacryloylthioethyl) sulfide and bis(2-methacryloylthioethylthioethyl)sulfide.

The compounds represented by the above formulas (7) and (8) make it possible to obtain cured products thereof that exhibit high refractive indexes or, concretely speaking, refractive indexes of not lower than 1.56 and high Abbe's numbers, and that can be favorably used for producing photochromic lenses.

Curable Composition:

The low-hardness monomers and the high-hardness monomers 1, 2, according to the present invention, are so mixed together that the cured product obtained by the copolymerization thereof exhibits the L-scale Rockwell hardness of not smaller than 60, preferably, not smaller than 65 and, particularly preferably, 70 to 110. Here, the L-scale Rockwell hardness of the cured product is confirmed in the same manner as the case of the low-hardness monomers described above.

The range of composition in which the cured product exhibits the L-scale Rockwell hardness of the above value varies depending upon the kinds of the monomers and cannot be exclusively determined. Generally, however, it is desired that the low-hardness monomers are used in amounts of from 1 to 50% by mass and, particularly, from 2 to 30% by mass, and the high-hardness monomers are used in amounts of from 50 to 99% by mass and, particularly, from 70 to 98% by mass based on the total mass of the monomers, so that the cured product thereof exhibits favorable photochromic properties and base member characteristics.

It is further desired that the high-hardness monomer 1 is used in an amount of from 2 to 50% by mass and, particularly, from 2 to 40% by mass and the high-hardness monomer 2 is used in an amount of from 50 to 98% by weight based on the mass of the whole high-hardness monomers, from the standpoint of increasing the hardness and heat resistance of the cured product.

Further, the curable composition of the present invention may be blended, as required, with other polymerizable monomers (hereinafter also referred to as arbitrary monomers) in addition to the low-hardness monomers and the high-hardness monomers within a range in which they will not impair the effect of the present invention.

Concrete examples of these other polymerizable monomers (hereinafter also referred to as arbitrary monomers) include polymerizable monofunctional monomers like unsaturated carboxylic acids such as acrylic acid, methacrylic acid and anhydrous maleic acid; acrylic acids and methacrylic acid ester compounds, such as methyl methacrylate, benzyl methacrylate, phenyl methacrylate and 2-hydroxyethyl methacrylate; fumaric acid ester compounds such as diethyl fumarate and diphenyl fumarate; thioacrylic acids and thiomethacrylic acid ester compounds, such as methyl thioacrylate, benzyl thioacrylate and benzyl thiomethacrylate; and vinyl compounds such as styrene, chlorostyrene, methylstyrene, vinylnaphthalene, α-methylstyrene dimer, and bromostyrene.

The above arbitrary monomers can be added in a single kind or being mixed in plural kinds together. The amount of addition is usually not larger than 40 parts by weight and, preferably, not larger than 30 parts by weight per a total amount of 100 parts by weight of the low-hardness monomers and the high-hardness monomers.

In the present invention, the whole polymerizable monomer contained in the curable composition desirably contains a polymerizable monomer having at least one epoxy group in an amount of from 0.01 to 40% by mass and, preferably, from 0.1 to 30% by mass from the standpoint of realizing excellent color-developing sensitivity and fading rate which are among the photochromic properties of the cured product yet maintaining light resistance of the photochromic properties.

In this case, the polymerizable monomer having at least one epoxy group may be any one of the low-hardness monomers, high-hardness monomer 1 or high-hardness monomer 2 satisfying the requirements and may further contain an arbitrary monomer. For example, the requirement may be satisfied by using a low-hardness monomer 5 and a low-hardness monomer 6 as part of the low-hardness monomers.

In the present invention, a particularly preferred example of the polymerizable monomer having at least one epoxy group is a compound represented by the following general formula (9),

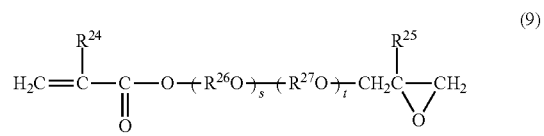

wherein $R^{24}$ and $R^{25}$ are, independently from each other, hydrogen atoms or methyl groups, $R^{26}$ and $R^{27}$ are, independently from each other, alkylene groups which may be substituted by a hydroxy group and having 1 to 4 carbon atoms, or groups represented by the formula

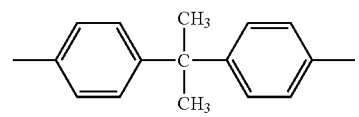

and s and t are, respectively, 0 to 20 in average.

Here, the alkylene groups represented by $R^{26}$ and $R^{27}$ are methylene groups, ethylene groups, propylene groups, butylene groups, trimethylene groups or tetramethylene groups. The values s and t are in average.

Among the compounds represented by the general formula (9), the compound in which $R^{24}$ is a hydrogen atom and a compound in which $R^{24}$ is a methyl group and s+t is 4 to 20, exhibits the L-scale Rockwell hardness of not larger than 40 when homopolymerized. It is therefore desired that these compounds are used alone as the low-hardness monomers or are used in combination with other low-hardness monomers. In particular, it is desired to use these compounds as the ones in which either the hydroxyl group or the mercapto group at the terminal of the low-hardness monomer 2 is an alkyloxy group having an epoxy group at the terminal, or as substituted alkyl acrylates in which the substituted alkyl in the low-hardness monomer 3 is an alkyl group having an epoxy group at the terminal. Examples of the compound represented by the general formula (9) include glycidyl acrylate, methylene glycidyl acrylate, ethylene glycidyl acrylate, propylene glycidyl methacrylate, polyethylene glycol glycidyl methacrylate having an average molecular weight of 406, polyethylene glycol glycidyl methacrylate having an average molecular weight of 538, polyethylene glycol glycidyl methacrylate having an average molecular weight of 1022, and polypropylene glycol glycidyl methacrylate having an average molecular weight of 664. Among them, the glycidyl acrylate is particularly preferred.

Among the compounds represented by the general formula (9), a compound in which $R^{32}$ is a methyl group and s+t is 0 to 3 exhibits the L-scale Rockwell hardness of not smaller than 60 when it is homopolymerized. It is therefore desired to use this compound alone as the high-hardness monomer 2 or in combination with the other high-hardness monomer 2. From the standpoint of obtaining particularly excellent photochromic properties, it is most desired to use the compound in combination with the compounds represented by the general formulas (5) to (8). Examples of the compound represented by the general formula (9) include glycidyl methacrylate, methylene glycidyl methacrylate, ethylene glycidyl methacrylate, propylene glycidylmethacrylate, and diethylene glycidyl ethacrylate. Among them, the glycidyl methacrylate is particularly desired.

Among the compounds represented by the general formula (9), further, the compounds that pertain to neither the low-hardness monomer nor the high-hardness monomer 2 may be the butylene glycidyl methacrylate and the like.

D) Photochromic Compounds:

As the photochromic compound used in the curable composition of the present invention, any known photochromic compound can be used without limitation. Known examples of the photochromic compound are fulgimide compound, spirooxazine compound and chromene compound. In the present invention, it is allowed to use these photochromic compounds. When a photochromic compound having a molecular weight of not smaller than 540 is used, in particular, favorable photochromic properties are exhibited.

As the fulgimide compound, spirooxazine compound and chromene compound, there can be preferably used those compounds that have been disclosed in, for example, Japanese Unexamined Patent Publication (Kokai) No. 28154/1990, Japanese unexamined Patent Publication (Kokai) No. 288830/1987, PCT International Patent Application No. 22850/1994, and PCI International Patent Application No. 14596/1996.

There can be further favorably used the compounds having excellent photochromic properties that newly discovered by the present inventions and are proposed in pending patent applications (Japanese Patent Applications Nos. 207871/1997, 23110/1999, 27959/1999, 27961/1999, 27960/1999, 140836/1999, 144072/1999, 150690/1999, 144074/1999, 156270/1999, 154272/1999, 188146/1999 and 188902/1999).

Among these photochromic compounds, a chromene compound exhibits photochromic properties maintaining light resistance larger than that of other photochromic compounds and, further, exhibits particularly greater color density and fading rate among other photochromic properties compared to those of other photochromic compounds, and can be favorably used. Among the chromene compounds, further, the compound having a molecular weight of not smaller than 540 exhibits markedly improved color density and fading rate among other photochromic properties compared to those of other chromene compounds, and can be used particularly favorably.

As the chromene compound that can be favorably used in the present invention, there can be exemplified a compound represented by the following general formula (10),

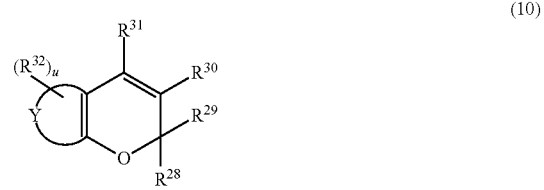

wherein a group represented by the following formula (11)

is a substituted or unsubstituted aromatic hydrocarbon group or a substituted or unsubstituted unsaturated heterocyclic group, Y represents a portion obtained by removing —C=C— from the aromatic or heterocyclic group, $R^{30}$, $R^{31}$ and $R^{32}$ are hydrogen atoms, alkyl groups, alkoxy groups, aralkoxy groups, amino groups, substituted amino groups, cyano groups, substituted or unsubstituted arylgroups, halogen atoms, aralkyl groups, hydroxyl groups, substituted or unsubstituted alkinyl groups, substituted or unsubstituted heterocyclic groups containing a nitrogen atom as a hetero atom an in which the nitrogen atom is bonded to a pyran ring or to a ring of the group represented by the above formula (10), or condensed heterocyclic groups in which the heterocyclic group is condensed with an aromatic hydrocarbon ring or an aromatic heterocyclic ring, u is an integer of 0 to 6, $R^{28}$ and $R^{29}$ are, independently from each other, groups represented by the following formula (12),

wherein $R^{33}$ is a substituted or unsubstituted aryl group, or substituted or unsubstituted heteroaryl group, $R^{34}$ is a hydrogen atom, an alkyl group or a halogen atom, and v is an integer of 1 to 3, a group represented by the following formula (13),

$R^{35}$                                      (13)

wherein $R^{35}$ is a substituted or unsubstituted aryl group, or a substituted or unsubstituted heteroaryl group, and w is an integer of 1 to 3, a substituted or unsubstituted aryl group, a substituted or unsubstituted heteroaryl group, or an alkyl group, or $R^{28}$ and $R^{29}$ together may constitute an aliphatic hydrocarbon ring or an aromatic hydrocarbon ring.

Examples of the substituents $R^{30}$ to $R^{32}$ include alkyl groups such as methyl groups, ethyl groups, propyl groups and butyl groups; aralkoxy groups such as methoxy groups, ethoxy groups, alkoxy groups of propoxy groups, phenoxy groups and naphthoxy groups; substituted amino groups such as dimethylamino groups and diethylamino groups; heterocyclic groups such as morpholino groups, piperidyno groups, pyrolydino groups, piperadino groups and indolino groups; aryl groups such as phenyl groups, naphthyl groups and benzyl groups; halogen atoms such as fluorine atoms, chlorine atoms and bromine atoms; aralkyl groups such as benzyl groups and phenetyl groups; and alkenyl groups such as ethenyl groups and 2-propynyl groups. Further, the substituents defined by $R^{30}$ to $R^{32}$ apply to the substituents in the substituted aryl group or in the substituted heteroaryl group described in the above formulas (12) and (13) and in connection with $R^{28}$ and $R^{29}$.

More preferred chromene compounds are those represented by the following general formulas (14) to (19),

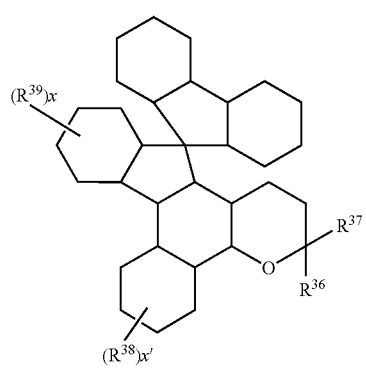

(14)

wherein $R^{36}$ and $R^{37}$ are as defined by $R^{28}$ and $R^{29}$ in the above formula (10), $R^{38}$ and $R^{39}$ are as defined by $R^{30}$, $R^{31}$ and $R^{32}$ in the above formula (10), and x and x' are integers of 0 to 4,

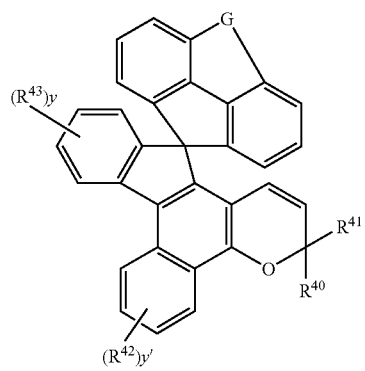

(15)

wherein $R^{40}$ and $R^{41}$ are as defined by $R^{28}$ and $R^{29}$ in the above formula (10), $R^{42}$ and $R^{43}$ are as defined by $R^{30}$, $R^{31}$ and $R^{32}$ in the above formula (10), y and y' are integers of 0 to 4, and G is any one of the groups represented by the following formulas,

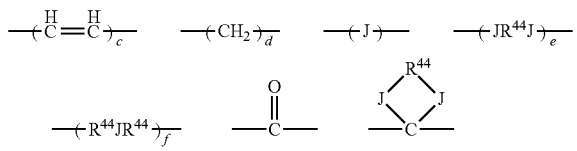

wherein J is an oxygen atom or a sulfur atom, $R^{44}$ is an alkylene group having 1 to 6 carbon atoms, and c, d, e and f are integers of 1 to 4,

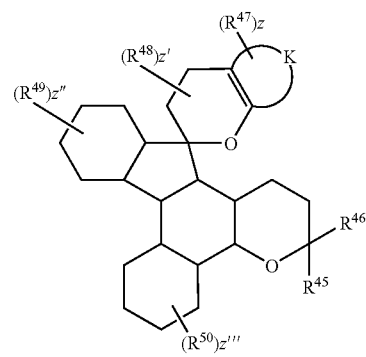

wherein $R^{45}$ and $R^{46}$ are as defined by $R^{28}$ and $R^{29}$ in the above formula (10), K represents a portion obtained by removing —C=C— from the aromatic or heterocyclic group, $R^{47}$, $R^{48}$, $R^{49}$ and $R^{50}$ are as defined by $R^{30}$, $R^{31}$ and $R^{32}$ in the above formula (10), z is an integer of 9 to 6, z', z" and z''' are integers of 0 to 4, and the following formula

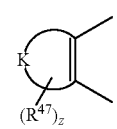

represents a substituted or unsubstituted aromatic hydrocarbon group, or a substituted or unsubstituted unsaturated heterocyclic group, K represents a portion obtained by removing —C=C— from the aromatic or heterocyclic group,

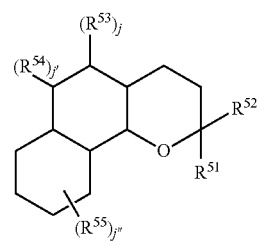

wherein $R^{51}$ and $R^{52}$ are as defined by $R^{28}$ and $R^{29}$ in the above formula (10), $R^{53}$, $R^{54}$ and $R^{55}$ are as defined by $R^{30}$, $R^{31}$ and $R^{32}$ in the above formula (10), j and j' are 0 or 1, and j" is an integer of 0 to 4,

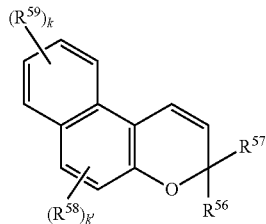

wherein $R^{56}$ and $R^{57}$ are as defined by $R^{28}$ and $R^{29}$ in the above formula (10), $R^{58}$ and $R^{59}$ are as defined by $R^{30}$, $R^{31}$ and $R^{32}$ in the above formula (10), k is an integer of 0 to 2, and k' is an integer of 0 to 4,

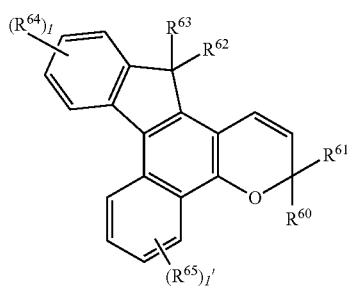

wherein $R^{60}$ and $R^{61}$ are as defined by $R^{28}$ and $R^{29}$ in the above formula (10), $R^{62}$, $R^{63}$, $R^{64}$ and $R^{65}$ are as defined by $R^{30}$, $R^{31}$ and $R^{32}$ in the above formula (10), and l and l" are integers of 0 to 4.

More preferred chromene compounds of the present invention are those having structures as shown below.

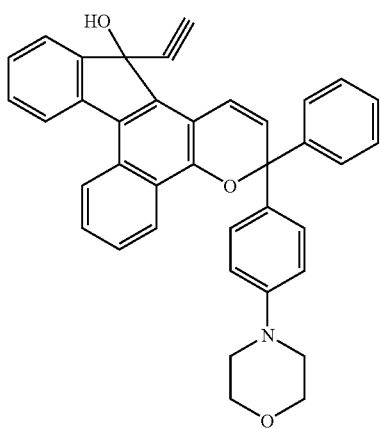 [SMILES: C#CC1(O)c2ccccc2-c2c1c1c(c3ccccc23)OC(c2ccccc2)(c2ccc(N3CCOCC3)cc2)C=C1]

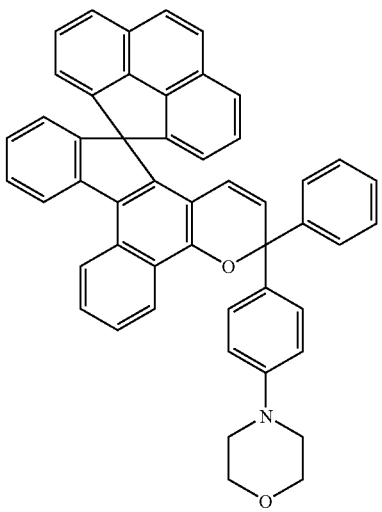 [SMILES: C1=CC(c2ccccc2)(c2ccc(N3CCOCC3)cc2)Oc2c1c1c(c3ccccc23)-c2ccccc2C12c1cccc3ccc4cccc2c4c13]

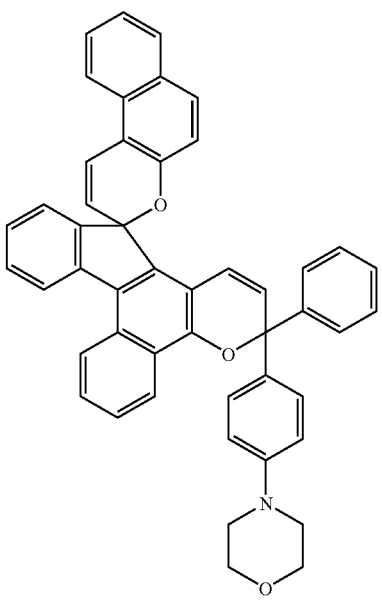

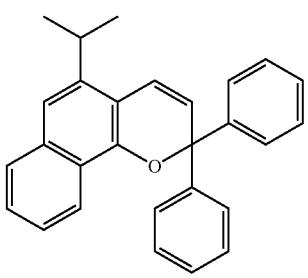

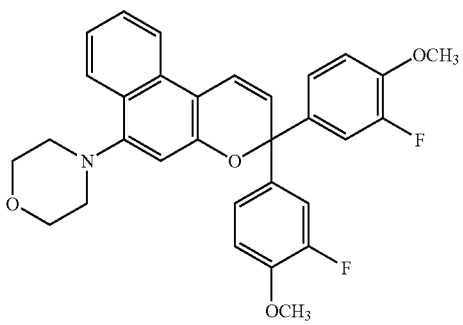

-continued

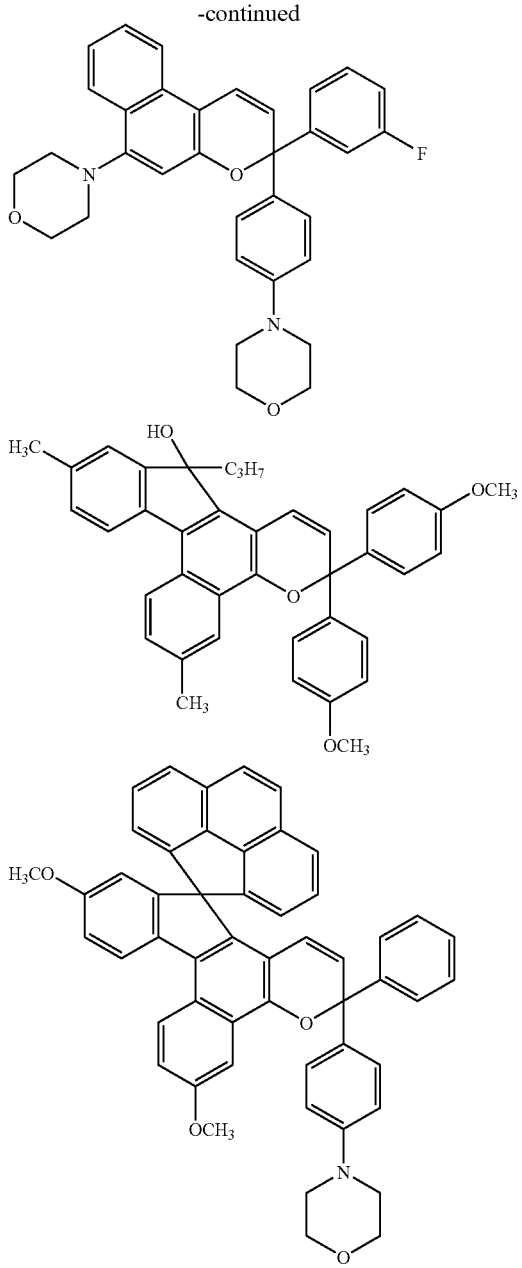

In the curable composition of the present invention, there is no particular limitation on the amount of adding the photochromic compound. Generally, however, the amount of addition is from 0.001 to 5 parts by weight, preferably, from 0.005 to 1 part by weight and, more preferably, from 0.01 to 0.5 parts by weight per 100 parts by weight of all polymerizable monomers inclusive of arbitrary monomers. When the amount of addition of the photochromic compound is smaller than 0.001 part by weight, the color density may decrease. When the amount of addition is greater than 5 parts by weight, the photochromic compound does not dissolve in the polymerizable monomers to a sufficient degree and becomes nonuniform, often giving rise to the occurrence of shading in the color density.

Other Blended Components:

In order to improve light resistance, color-developing rate and color-fading rate of the photochromic compound, moldability, the curable composition of the present invention may be further blended with additives such as surfactant, antioxidant, radical-trapping agent, ultraviolet stabilizer, ultraviolet absorber, parting agent, coloring-preventing agent, antistatic agent, fluorescent dye, dye, pigment and perfume. Any known additives can be used without limitation.

As the surfactant, for example, there can be used any one of the nonionic type, anionic type or cationic type. From the standpoint of dissolution in the polymerizable monomer, however, it is desired to use a nonionic surfactant. Concrete examples of the nonionic surfactant that can be favorably used include sorbitan fatty acid ester, glycerin fatty acid ester, decaglycerin fatty acid ester, propylene glycol pentaerythritol fatty acid ester, polyoxyethylenesorbitan fatty acid ester, polyoxyethylenesorbit fatty acid ester, polyoxyethyleneglycerin fatty acid ester, polyethylene glycol fatty acid ester, polyoxyethylenealkyl ether, polyoxyethylenephytosterol phytostanol, polyoxyethylenepolyoxypropylenealkyl ether, polyoxyethylenealkylphenyl ether, polyoxyethylene castor oil-cured castor oil, polyoxyethylenelanolin-lanolin alcohol-bee wax derivative, polyoxyethylenealkylamine-fatty acid amide, polyoxyethylenealkylphenylformaldehyde condensation product, and single-chain polyoxyethylenealkyl ether. The surfactants may be used being mixed in two or more kinds. It is desired that the surfactants are added in amounts of from 0.1 to 20 parts by weight per 100 parts by weight of the total polymerizable monomers.

As the antioxidant, radical-trapping agent, ultraviolet stabilizer and ultraviolet absorber, there can be preferably used a hindered amine photostabilizer, a hindered phenol antioxidant, a phenol-type radical-trapping agent, sulfur-type antioxidant, benzotriazole compound and benzophenone compound. The antioxidant, radical-trapping agent, ultraviolet stabilizer and ultraviolet absorber may be used being mixed in two or more kinds. In using these nonpolymerizable compounds, there may be further used a surfactant in combination with the antioxidant, radical-trapping agent, ultraviolet stabilizer and ultraviolet absorber. It is desired that the antioxidant, radical-trapping agent, ultraviolet stabilizer and ultraviolet absorber are added in amounts over a range of from 0.001 to 1 part by weight per 100 parts by weight of the whole polymerizable monomers.

Cured Product and its Preparation:

There is no particular limitation on the method of preparing the curable composition of the present invention; i.e., the composition is prepared by weighing and mixing the components in predetermined amounts. There is no particular limitation on the order of adding the components. All components may be simultaneously added up. Or, the monomer components only may be mixed in advance and, then, for example, the photochromic compound and other additives may be added and mixed just prior to conducting the polymerization as will be described later. In conducting the polymerization as will be described later, a polymerization initiator may further be added as required.

The photochromic cured product obtained by curing he curable composition of the present invention is useful as an optical material such as photochromic lens material. In this case, the photochromic cured product may serve as a main optical material such as of lenses, or may be a coated layer formed on the surface of the optical material and is cured.

There is no particular limitation on the method of obtaining a photochromic cured product by curing the curable composition of the present invention, and any known polymerization method can be employed depending upon the kinds of the monomers that are used. The polymerization can be initiated by using radical polymerization initiators such as various peroxides and azo compounds, or by being irradiated with ultraviolet rays, α-rays or γ-rays, or by utilizing both of them.

Though there is no particular limitation on the polymerization method, it is desired to employ the cast polymerization from such a standpoint that the photochromic cured product may be used as a main body of the optical material such as of photochromic lenses. The representative cast polymerization will be described below in further detail.

In this method, the curable composition of the present invention to which a radical polymerization initiator is added, is poured into the mold that is held by an elastomer gasket or a spacer, and is heated in an air furnace so as to be polymerized and cured and is, then, taken out.

There is no particular limitation on the radical polymerization initiator, and any known compound can be used. Representative examples include diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butylperoxy dicarbonate, cumylperoxy neodecanate, and t-butylperoxy benzoate; percarbonates such as diisopropylperoxy dicarbonate, di-2-ethylhexylperoxy dicarbonate, and di-sec-butyloxy carbonate; and azo compounds such as 2,2'-azobisisobutylonitrile, 2,2'-azobis(4-dimethylvaleronitrile), 2,2'-azobis(2-methylbutylonitrile), and 1,1'-azobis(cyclohexane-1-carbonitrile).

The amount of the radical polymerization initiator varies depending upon the polymerization conditions, kind of the initiator, kind and composition of the curable composition of the present invention, and cannot be exclusively specified. Generally, however, the radical polymerization initiator is used in an amount of from 0.01 to 10 parts by weight per 100 parts by weight of the whole polymerizable monomers.

Among the polymerization conditions, the temperature particularly affects the polymerization. The temperature varies depending upon the kind and amount of the initiator and the kind of the monomer, and cannot be exclusively specified. Generally, however, it is desired to conduct the so-called tapered two-stage polymerization in which the curing is effected by raising the temperature from a relatively low temperature, preferably from 25 to 35° C. through up to a high temperature, preferably, 70 to 120° C. at the time when the polymerization is finished.

The polymerization time, too, varies depending upon various factors like the temperature, and it is desired to determine an optimum time in advance depending upon the conditions. Generally, it is desired to so select the conditions that the polymerization is completed in 2 to 40 hours.

The cast polymerization can be similarly conducted even by the known photo polymerization by using ultraviolet rays. As the photo polymerization initiator in this case, there can be used benzoin, benzoinmethyl ether, benzoinbutyl ether, benzophenol, acetophenone-4,4'-dichlorobenzophenone, diethoxyacetophenone, 2-hydroxy-2-methyl-1-phenylpropane-1-on, benzylmethylketal, 1-(4-isopropylphenyl)-2-hydroxy-2-methylpropane-1-on, 1-hydroxycyclohexylphenyl ketone, and 2-isopropylthioxanthone. In general, these photo polymerization initiators are used in an amount of from 0.001 to 5 parts by weight per 100 parts by weight of the whole monomers.

The cured product of the present invention obtained by the above-mentioned method can be processed in a manner as described below depending upon the applications. That is, the cured product is dyed by using a dye such as dispersion dye, is treated with a hard coating by using a silane coupling agent, a hard coating agent comprising chiefly a sol of an oxide of silicon, zirconium, antimony or aluminum, or a hard coating agent comprising chiefly an organic high molecules, is subjected to the reflection-reducing treatment by being deposited with a thin film of a metal oxide such as SiO2, TiO2 or ZrO2 or by being coated with a thin film of organic high molecules, or is subjected to the antistatic treatment and a secondary treatment.

The photochromic cured product obtained by curing the curable composition of the present invention may be cured in compliance with the above-mentioned conditions even when it is to be used as a coated layer on the lenses. It is generally desired that the coated layer has a thickness of from 2 to 1000 μm.

EXAMPLES

The present invention will be described in further detail to which only, however, the invention is in no way limited.

The compounds used in the following Examples are as described below.

(1) Low-Hardness Monomers.

Shown are the L-scale Rockwell hardnesses (hereinafter often simply referred to as "homo-HL" (measuring method is described in Photochromatic Characteristics ④ appearing later)) of the polymers obtained by homopolymerizing, by the cast polymerization, substantially the whole amount of the monomers that are fed.

9PG: Polypropylene glycol dimethacrylate having an average molecular weight of 676 (homo-HL<20).
MAPEG (526): Polyethylene glycol methacrylate having an average molecular weight of 526. (homo-HL<20).
9G: Polyethylene glycol dimethacrylate having an average molecular weight of 550 (homo-HL<30).
MAPPG (430): Propylene glycol methacrylate having an average molecular weight of 430 (homo-HL<20).
C18MA: Stearyl methacrylate (homo-HL<30).
MAMePEG (468): Methyl ether polyethylene glycol methacrylate having an average molecular weight of 468 (homo-HL<20).
MAMePEG (1100): Methyl ether polyethylene glycol methacrylate having an average molecular weight of 1100 (homo-HL<20).
MATHF (650): Polyhexamethylene glycol dimethacylate having an average molecular weight of 650 (homo-HL<20).
NerolMA: Nerol methacrylate (homo-HL<20).
OleylMA: Oleyl methacrylate (homo-HL<20).
MAPhPEG (2034): Octylphenyl ether polyethylene glycol methacrylate having an average molecular weight of 2034 (homo-HL<20).
SAL9E: Isononyl ether polyethylene glycol methacrylate having an average molecular weight of 608 (homo-HL<20).
CFMA: Perfluoroheptylethylene glycol methacrylate (homo-HL<30).
PEGGMA (538): Glycidylpolyethylene glycol methacrylate having an average molecular weight of 538 (homo-HL<20).
GA: Glycidyl acrylate (homo-HL<20).
ACPEGMA (524): Acetylpolyethylene glycol methacrylate having an average molecular weight of 524 (homo-HL<20).
DAPEG (258): Polyethylene glycol diacrylate having an average molecular weight of 258 (homo-HL<20).
DAPEG (522): Polyethylene glycol diacrylate having an average molecular weight of 522 (homo-HL<20).
MeAPEG (428): Methyl ether polyethylene glycol acrylate having an average molecular weight of 482 (homo-HL<20).
MeA: Methyl acrylate (homo-HL<20).
BuA: Butyl acrylate (homo-HL<20).
C12A: Lauryl acrylate (homo-HL<20)
MeSMAPEG (640): Methylthio ether polyethylenethio glycol methacrylate having an average molecular weight of 640.

PEGE (774): Polyethylene glycol diglycidyl ether having an average molecular weight of 774.

PESGE (834): Polyethylenethio glycol thiodiglycidyl ether having an average molecular weight of 834.

SR9036: Ethylene oxide-isopropylidenediphenolbis methacrylate having an average ethylene oxide addition number of 30 (homo-HL<40).

(2) High-Hardness monomers.

High-Hardness Monomers 1.

TMPT: Trimethylolpropane trimethacrylate (homo-HL=122).

ATM4E: Ethoxylated pentaerythritol tetraacrylate (homo-HL=100).

TMM360: Pentaerythritol trimethacrylate/pentaerythritol tetramethacrylate=60/40 (homo-HL=122).

U4HA: Urethane oligomer tetramethacrylate (homo-HL=110).

High-Hardness Monomers 2:

4G: Tetraethylene glycol dimethacrylate (homo-HL=90).

3G: Triethylene glycol dimethacrylate (homo-HL=110).

BPE: 2,2-Bis(4-methacryloyloxyethoxyphenyl)propane (homo-HL=110).

4PG: Tetrapropylene glycol dimethacrylate (homo-HL 70).

DVB: Divinyl benzene (homo-HL=110).

DVBP: Divinylbiphenyl (homo-HL=110).

3S4G: Bis(2-methacryloyloxyethylthioethyl)sulfide (homo-HL=90).

3S2G: Bis(2-methacryloylthioethyl)sulfide (homo-HL=120).

GMA: Glycidyl methacrylate (homo-HL=80).

(3) Arbitrary Monomers.

αMS: α-Methylstyrene (homo-HL=50).

MSD: α-Methylstyrene dimer (not homopolymerized).

HEMA: Hydroxyethyl methacrylate (homo-HL=80).

(4) Photochromic Compounds.

Chromene 1.

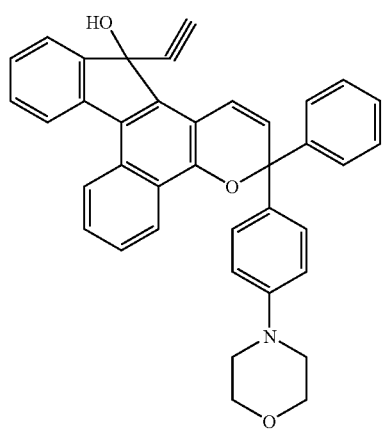

(molecular weight, 547)

Chromene 2.

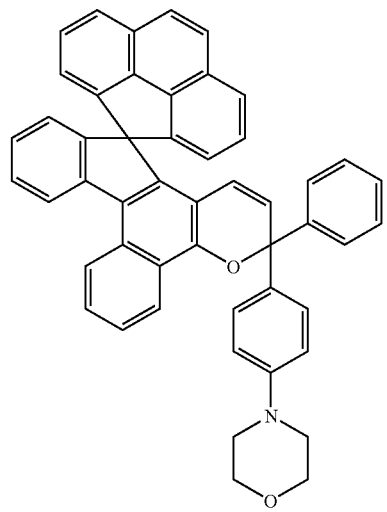

(molecular weight, 681)

Chromene 3.

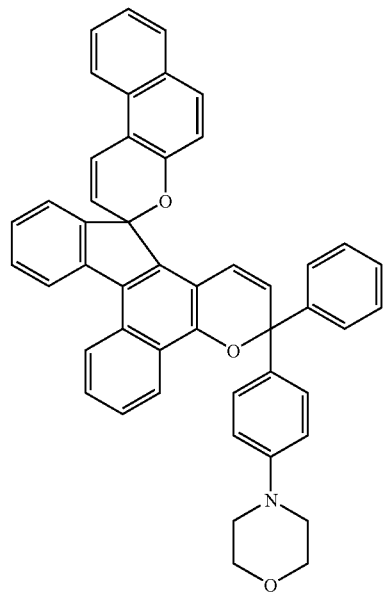 [SMILES: C1=CC(c2ccccc2)(c2ccc(N3CCOCC3)cc2)Oc2c1c1c(c3ccccc23)-c2ccccc2C12C=Cc1c(ccc3ccccc13)O2]

(molecular weight, 673)

Chromene 4.

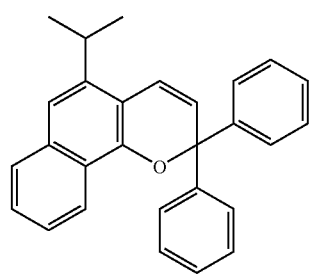 [SMILES: CC(C)c1cc2ccccc2c2c1C=CC(c1ccccc1)(c1ccccc1)O2]

(molecular weight, 376)

Chromene 5.

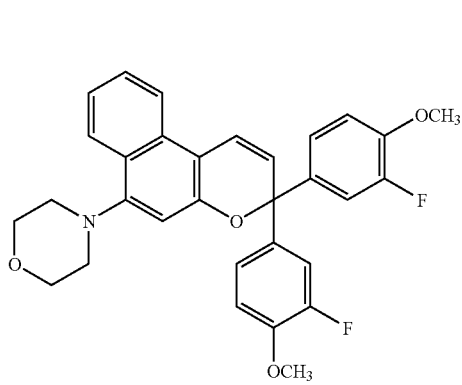 [SMILES: COc1ccc(C2(c3ccc(OC)c(F)c3)C=Cc3c(cc(N4CCOCC4)c4ccccc34)O2)cc1F]

(molecular weight, 515)

Chromene 6.

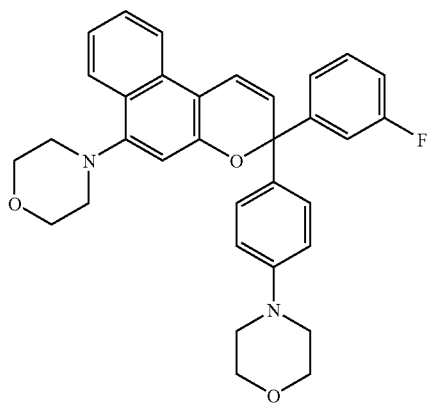 [SMILES: Fc1cccc(C2(c3ccc(N4CCOCC4)cc3)C=Cc3c(cc(N4CCOCC4)c4ccccc34)O2)c1]

(molecular weight, 522)

Chromene 7.

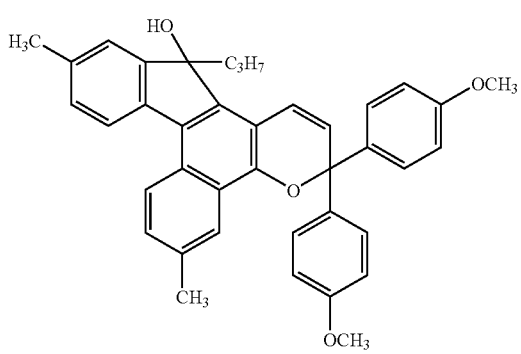

(molecular weight, 568)

Chromene 8.

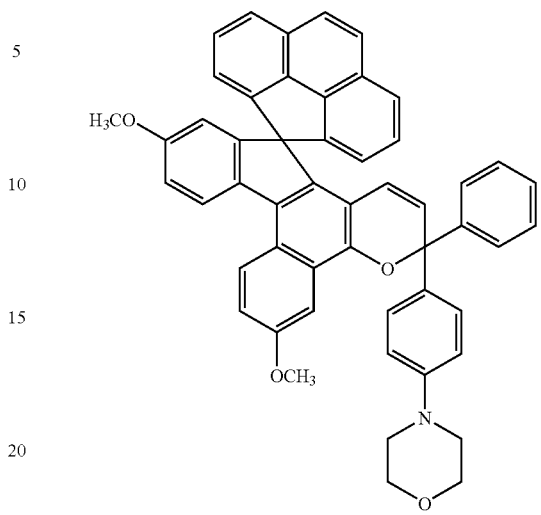

(molecular weight, 741)

(5) Surfactant.

Tween 20: Polyoxyethylene (20) sorbitan monolaurate.

(6) Polymerization Initiator.

Perbutyl ND: t-Butylperoxy neodecanate (trade name: Perbutyl ND, produced by Nippon Yushi Co.).

Example 1

0.03 Parts by weight of the chromene 1 and 1 part by weight of the perbutyl ND as the polymerization initiator, were added to 100 parts by weight of polymerizable monomers comprising 20 parts by weight of TMPT, 55 parts by weight of tetraethylene glycol dimethacrylate, 7 parts by weight of glycidyl methacrylate, 5 parts by weight of αMS, 1 part by weight of MSD and 12 parts by weight of MAPEG 526, and were mixed to a sufficient degree. This mixture solution was poured into a mold constituted by a glass plate and a gasket of an ethylene/vinyl acetate copolymer, and substantially the whole amount of the above monomer composition was polymerized by cast polymerization. The polymerization was conducted by using an air furnace while gradually raising the temperature from 30° C. to 90° C. over a period of 18 hours and maintaining the temperature at 90° C. for 2 hours. After the polymerization has been finished, the polymer was removed from the glass mold.

The thus obtained polymer sample (2 mm thick) was irradiated with light by using a xenon lamp L-2480 (300 W) SHL-100 manufactured by Hamamatsu Photonics Co. through an aeromass filter (manufactured by Coning Co.) at 20° C.±1° C. at beam intensities on the polymer surface of 365 nm=2.4 mW/cm$^2$ and 245 nm=24 μW/cm$^2$ for 120 seconds to develop color and to measure the photochromic properties. The photochromic properties were evaluated by the following methods, and were as shown in Table 2.

① Maximum absorption wavelength (λmax): A maximum absorption wavelength after the development of color as found by using a spectrophotometer (instantaneous multi-channel photodetector MCPD 1000) manufactured by Otsuka Denshi Co. The maximum absorption wavelength is related to the color tone at the time when the color is developed.

② Color density {ε(120)−ε(0)}: A difference between an absorbancy {ε(120)} after irradiated with light for 120 seconds at the maximum absorption wavelength and ϵ(0). It can be said that the higher this value, the more excellent the photochromic properties are.

③ Fading rate [t½(min)]: The time until the absorbancy of a sample at the maximum wavelength drops down to one-half the {ϵ(120)–ϵ(0)} from when the sample is no longer irradiated with light after it was irradiated with light for 120 seconds. It can be said that the shorter the time, the more excellent the photochromic properties are.

④ Light resistance (%)={(A200/A0)×100}: The following deterioration promotion testing was conducted in order to evaluate the light resistance of color developed by the irradiation with light. That is, the obtained polymer (sample) was deteriorated by using a xenon weather meter X25 manufactured by Suga Shikenki Co. for 200 hours. Thereafter, the color densities were evaluated before and after the testing; i.e., a color density (A0) before the testing and a color density (A200) after the testing were measured, and a value {(A200/A0)×100} was calculated as a remaining factor (%) to use it as an index of resistance of the developed color. The higher the remaining factor, the higher the resistance of the developed color.

Further, the properties of the base member were evaluated concerning the following items, and the obtained results were as shown in Table 3.

⑤ L-scale Rockwell hardness (HL): After left to stand in a room maintained at 25° C. for one day, the cured product was measured for its L-scale Rockwell hardness by using the Akashi Rockwell hardness meter (model, AR-10).

⑥ Impact resistance: A steel ball was permitted to naturally fall on a test plate having a thickness of 2 mm and a diameter of 65 mm from a height of 127 cm, and the impact resistance was evaluated in terms of the weight of the steel ball by which the test plate was broken. The basis of evaluation was such that "1" was when the weight of the steel ball at this moment was smaller than 20 g, "2" was when the weight was 20 to 40 g, "3" was when the weight was 40 to 60 g, "4" was when the weight was 60 to 80 g, and "5" was when the weight was not smaller than 80

⑦ Heat resistance: The molded and cured product was fitted to the frame and was heated at 120° C. ○ x represents the case when the frame was not deviated, and x represents the case when the frame was deviated.

⑧ Optical distortion: The molded and cured product was observed for its optical distortion under the crossed-Nicol. ○ represents the case when there was no optical distortion, and x represents the case when there was optical distortion.

⑨ Refractive index: The refractive index was measured at 20° C. by using a refractometer manufactured by Atago Co. A bromonaphthaline or a methylene iodide was used as a contact solution.

Examples 2 to 58

Photochromic cured products were obtained in the same manner as in Example 1 but using polymerizable monomer compositions, chromene compounds and other additives shown in Tables 1, 2 and 3, and were evaluated for their photochromic properties and base member properties. The results were as shown in Tables 4, 5 and 6.

TABLE 1

| Ex. No. | Low-hardness monomer (parts by wt) | | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|---|
| 1 | MAPEG(526) | 5 | TMPT | 5 | 4G/GMA | 77/7 | α MS/MSD | 5/1 | — | chromene 1 | 0.03 |
| 2 | MAPEG(526) | 10 | TMPT | 20 | 4G/GMA | 57/7 | α MS/MSD | 5/1 | — | chromene 1 | 0.03 |
| 3 | MAPEG(526) | 20 | TMPT | 40 | 4G/GMA | 27/7 | α MS/MSD | 5/1 | — | chromene 1 | 0.03 |
| 4 | MAPEG(526) | 10 | TMPT/U4HA | 20/10 | 4G/GMA | 47/7 | α MS/MSD | 5/1 | — | chromene 1 | 0.03 |
| 5 | MAPPG(430) | 5 | TMPT | 10 | 4PG | 85 | — | | — | chromene 1 | 0.03 |
| 6 | MAPPG(430) | 10 | TMPT | 25 | 4PG | 65 | — | | — | chromene 1 | 0.03 |
| 7 | MAPPG(430) | 20 | TMPT | 40 | 4PG | 40 | — | | — | chromene 1 | 0.03 |
| 8 | MAPPG(430) | 10 | TMPT/U4HA | 20/13 | 4PG | 57 | — | | — | chromene 1 | 0.03 |
| 9 | C18MA | 10 | TMPT | 20 | BPE/3G/GMA | 35/20/9 | α MS/MSD | 5/1 | — | chromene 2 | 0.03 |
| 10 | C18MA | 15 | TMPT | 20 | BPE/4PG/GMA | 20/30/15 | — | | — | chromene 2 | 0.03 |
| 11 | MAPEG(526)/MAPPG(430) | 5/5 | TMPT/U4HA | 10/20 | BPE/4PG/GMA | 10/45/14 | MSD | 1 | — | chromene 2 | 0.03 |
| 12 | 9G | 20 | TMPT | 20 | 4G/3G/GMA | 45/12/7 | — | | — | chromene 2 | 0.03 |
| 13 | MAPEG(526) | 12 | ATM4E | 48 | 4G | 40 | — | | — | chromene 3 | 0.03 |
| 14 | MAPPG(430) | 10 | TMPT | 20 | 4PG | 55 | α MS | 15 | — | chromene 3 | 0.05 |
| 15 | MAPPG(430) | 15 | TMPT | 20 | BPE/4PG | 35/28 | MSD | 2 | — | chromene 4 | 0.05 |
| 16 | MAPEG(526) | 10 | TMPT | 20 | 4G/GMA | 57/15 | — | | — | chromene 5 | 0.05 |
| 17 | 9PG | 30 | TMPT | 30 | 4G/3G/GMA | 20/5/15 | — | | — | chromene 5 | 0.05 |
| 18 | MAPEG(526) | 15 | TMPT/ATM4E | 20/35 | 4PG | 30 | — | | — | chromene 6 | 0.03 |
| 19 | 9G | 20 | TMPT | 20 | 4G/3G/GMA | 45/12/3 | — | | — | chromene 7 | 0.03 |
| 20 | 9G | 20 | TMPT/4G/3G | 20 | 4G/3G/GMA | 45/12/3 | — | | Tween20 0.5 | chromene 7 | 0.03 |
| 21 | MAMePEG(468) | 10 | TMPT | 20 | 4G/3G/GMA | 48/15/7 | α MS/MSD | 5/1 | — | chromene 8 | 0.03 |

TABLE 2

| Ex. No. | Low-hardness monomer (parts by wt) | | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|---|
| 22 | MAMePEG(468) | 10 | TMPT | 20 | 4G/3PG/GMA | 15/45/10 | MSD | 1 | — | chromene 8 | 0.03 |
| 23 | MAMePEG(468) | 10 | TMPT | 15 | 4G/3PG/GMA | 5/58/10 | α MS/MSD | 2/1 | — | chromene 8 | 0.03 |
| 24 | MAMePEG(468) | 10 | TMPT | 20 | BPE/3G/GMA | 48/5/9 | α MS/MSD | 8/1 | — | chromene 8 | 0.03 |
| 25 | MAMePEG(468) | 10 | TMPT | 20 | BPE/4G/GMA | 48/5/9 | α MS/MSD | 8/1 | — | chromene 8 | 0.03 |

TABLE 2-continued

| Ex. No. | Low-hardness monomer (parts by wt) | | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|---|
| 26 | MAMePEG(468) | 10 | TMPT | 20 | BPE/4G/GMA | 48/5/4 | HEMA/αMS/MSD 5/8/1 | | — | chromene 8 | 0.03 |
| 27 | MATHF(650) | 10 | TMPT | 10 | 4G/GMA | 67/7 | αMS/MSD | 5/1 | — | chromene 1 | 0.03 |
| 28 | NerolMA | 5 | TMPT | 20 | 4G/GMA | 59/7 | αMS/MSD | 5/1 | — | chromene 1 | 0.03 |
| 29 | OleylMA | 5 | TMPT | 20 | 4G/GMA | 59/7 | αMS/MSD | 5/1 | — | chromene 1 | 0.03 |
| 30 | PhMAPEG(2034) | 3 | TMPT | 20 | 4G/GMA | 59/7 | αMS/MSD | 5/1 | — | chromene 1 | 0.03 |
| 31 | SAL9E | 10 | TMPT | 20 | 4G/GMA | 57/7 | αMS/MSD | 5/1 | — | chromene 1 | 0.03 |
| 32 | MAMePEG(1100) | 10 | TMM360 | 20 | 4G/GMA | 57/7 | αMS/MSD | 5/1 | — | chromene 1 | 0.03 |
| 33 | CFMA | 10 | TMM360 | 20 | 4G/GMA | 57/7 | αMS/MSD | 5/1 | — | chromene 1 | 0.03 |
| 34 | MAMePEG(468) | 15 | TMM360 | 20 | BPE/GMA | 48/9 | αMS/MSD | 8/1 | — | chromene 1 | 0.03 |
| 35 | PhMAPEG(2034) | 5 | TMPT | 20 | BPE/4G/GMA | 48/10/9 | αMS/MSD | 8/1 | — | chromene 1 | 0.03 |
| 36 | MAMePEG(468) | 10 | TMPT | 20 | 4PG/6PG/GMA | 15/30/10 | MSD | 1 | — | chromene 1 | 0.03 |
| 37 | MAPEG(526) | 10 | TMPT | 20 | 4G/GMA | 57/7 | αMS/MSD | 5/1 | — | chromene 2 | 0.03 |
| 38 | MAPEG(526) | 10 | TMPT | 20 | 4G/GMA | 57/7 | αMS/MSD | 5/1 | — | chromene 3 | 0.03 |
| 39 | MAPEG(526) | 10 | TMPT | 20 | 4G/GMA | 57/7 | αMS/MSD | 5/1 | — | chromene 4 | 0.03 |
| 40 | MAPEG(526) | 10 | TMPT | 20 | 4G/GMA | 57/7 | αMS/MSD | 5/1 | — | chromene 5 | 0.03 |
| 41 | MAPEG(526) | 10 | TMPT | 20/57 | 4G/GMA | 57/7 | αMS/MSD | 5/1 | — | chromene 6 | 0.03 |

TABLE 3

| Ex. No. | Low-hardness monomer (parts by wt) | | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|---|
| 42 | MAPEG(526) | 10 | TMPT | 20 | 4G/GMA | 57/7 | αMS/MSD | 5/1 | — | chromene 7 | 0.03 |
| 43 | MAPEG(526) | 10 | TMPT | 20 | 4G/GMA | 57/7 | αMS/MSD | 5/1 | — | chromene 8 | 0.03 |
| 44 | PEGGMA(538) | 10 | TMPT | 20 | 4G/GMA | 57/7 | αMS/MSD | 5/1 | — | chromene 8 | 0.03 |
| 45 | GA | 5 | TMPT | 20 | 4G/GMA | 62/7 | αMS/MSD | 5/1 | — | chromene 8 | 0.03 |
| 46 | GA | 5 | TMPT | 20 | 4G/GMA | 69 | αMS/MSD | 5/1 | — | chromene 8 | 0.03 |
| 47 | AcPEGMA(524) | 10 | TMPT | 20 | 4G/GMA | 57/7 | αMS/MSD | 5/1 | — | chromene 8 | 0.03 |
| 48 | DAPEG(258) | 10 | TMPT | 20 | 4G/GMA | 57/7 | αMS/MSD | 5/1 | — | chromene 8 | 0.03 |
| 49 | DAPEG(522) | 10 | TMPT | 20 | 4G/GMA | 57/7 | αMS/MSD | 5/1 | — | chromene 8 | 0.03 |
| 50 | MeAPEG(428) | 10 | TMPT | 20 | 4G/GMA | 57/7 | αMS/MSD | 5/1 | — | chromene 8 | 0.03 |
| 51 | MeA | 10 | TMPT | 20 | 4G/GMA | 57/7 | αMS/MSD | 5/1 | — | chromene 8 | 0.03 |
| 52 | BuA | 10 | TMPT | 20 | 4G/GMA | 57/7 | αMS/MSD | 5/1 | — | chromene 8 | 0.03 |
| 53 | C12A | 10 | TMPT | 20 | 4G/GMA | 57/7 | αMS/MSD | 5/1 | — | chromene 8 | 0.03 |
| 54 | MeSMAPEG(640) | 10 | TMPT | 20 | 4G/GMA | 57/7 | αMS/MSD | 5/1 | — | chromene 8 | 0.03 |
| 55 | PEGE(774) | 10 | TMPT | 20 | 4G/GMA | 57/7 | αMS/MSD | 5/1 | — | chromene 8 | 0.03 |
| 56 | PESGE(834) | 10 | TMPT | 20 | 4G/GMA | 57/7 | αMS/MSD | 5/1 | — | chromene 8 | 0.03 |
| 57 | MeMAPEG(1100) | 6 | DVB/TMPT | 5/4 | 3S4G/GMA | 70/1 | αMS/MSD | 13/1 | — | chromene 8 | 0.03 |
| 58 | MeMAPEG(1100) | 6 | DVBP/TMPT | 5/4 | 3S2G/GMA | 70/1 | αMS/MSD | 13/1 | — | chromene 8 | 0.03 |

TABLE 4

| Ex. No. | HL hardness | λ Max (nm) | Color density | Fading rate (min) | Light resistance (%) | Optical distortion | Heat resistance | Impact resistance | Refractive index |
|---|---|---|---|---|---|---|---|---|---|
| 1 | 88 | 586 | 0.8 | 2 | 82 | ○ | ○ | 4 | 1.523 |
| 2 | 96 | 586 | 1.1 | 1 | 82 | ○ | ○ | 4 | 1.532 |
| 3 | 100 | 586 | 1.3 | 0.6 | 81 | ○ | ○ | 3 | 1.523 |
| 4 | 94 | 586 | 0.9 | 1 | 82 | ○ | ○ | 5 | 1.523 |
| 5 | 86 | 584 | 0.9 | 1.5 | 65 | ○ | ○ | 3 | 1.503 |
| 6 | 93 | 584 | 1.2 | 0.8 | 65 | ○ | ○ | 3 | 1.502 |
| 7 | 100 | 584 | 1.4 | 0.5 | 65 | ○ | ○ | 3 | 1.501 |
| 8 | 95 | 584 | 1 | 0.9 | 65 | ○ | ○ | 4 | 1.505 |
| 9 | 94 | 580 | 0.72 | 0.6 | 86 | ○ | ○ | 4 | 1.53 |
| 10 | 96 | 580 | 0.8 | 0.5 | 86 | ○ | ○ | 4 | 1.527 |
| 11 | 95 | 580 | 0.82 | 0.5 | 87 | ○ | ○ | 5 | 1.531 |
| 12 | 95 | 580 | 0.7 | 1.1 | 87 | ○ | ○ | 4 | 1.523 |
| 13 | 90 | 580 | 1 | 1.5 | 65 | ○ | ○ | 3 | 1.525 |
| 14 | 93 | 580 | 1 | 1.8 | 65 | ○ | ○ | 4 | 1.532 |
| 15 | 96 | 478 | 1.5 | 2.5 | 63 | ○ | ○ | 4 | 1.523 |
| 16 | 96 | 442 | 1.2 | 1.1 | 82 | ○ | ○ | 3 | 1.522 |
| 17 | 100 | 442 | 1.1 | 1.3 | 80 | ○ | ○ | 3 | 1.52 |
| 18 | 88 | 478 | 1.2 | 1 | 65 | ○ | ○ | 3 | 1.521 |
| 19 | 92 | 576 | 0.7 | 2.5 | 78 | ○ | ○ | 3 | 1.523 |
| 20 | 91 | 576 | 0.7 | 2 | 79 | ○ | ○ | 3 | 1.52 |
| 21 | 98 | 610 | 0.73 | 0.9 | 88 | ○ | ○ | 4 | 1.52 |

TABLE 5

| Ex. No. | HL hardness | λ Max (nm) | Color density | Fading rate (min) | Light resistance (%) | Optical distortion | Heat resistance | Impact resistance | Refractive index |
|---|---|---|---|---|---|---|---|---|---|
| 22 | 98 | 606 | 0.88 | 0.85 | 88 | ◯ | ◯ | 4 | 1.52 |
| 23 | 100 | 606 | 0.91 | 0.88 | 88 | ◯ | ◯ | 3 | 1.523 |
| 24 | 88 | 614 | 0.68 | 1 | 88 | ◯ | ◯ | 4 | 1.545 |
| 25 | 84 | 612 | 0.8 | 0.9 | 88 | ◯ | ◯ | 4 | 1.545 |
| 26 | 88 | 614 | 0.72 | 0.9 | 88 | ◯ | ◯ | 4 | 1.523 |
| 27 | 93 | 584 | 0.7 | 0.95 | 82 | ◯ | ◯ | 4 | 1.523 |
| 28 | 90 | 584 | 0.7 | 0.85 | 82 | ◯ | ◯ | 3 | 1.522 |
| 29 | 84 | 584 | 0.7 | 1.1 | 82 | ◯ | ◯ | 4 | 1.523 |
| 30 | 98 | 584 | 0.68 | 0.67 | 82 | ◯ | ◯ | 4 | 1.522 |
| 31 | 92 | 584 | 0.8 | 1 | 82 | ◯ | ◯ | 3 | 1.522 |
| 32 | 89 | 584 | 0.75 | 0.82 | 82 | ◯ | ◯ | 3 | 1.515 |
| 33 | 82 | 584 | 0.7 | 0.85 | 82 | ◯ | ◯ | 3 | 1.545 |
| 34 | 86 | 592 | 0.8 | 0.8 | 82 | ◯ | ◯ | 4 | 1.545 |
| 35 | 90 | 584 | 0.7 | 0.62 | 82 | ◯ | ◯ | 4 | 1.515 |
| 36 | 96 | 584 | 0.8 | 1 | 82 | ◯ | ◯ | 4 | 1.523 |
| 37 | 96 | 580 | 0.7 | 0.7 | 86 | ◯ | ◯ | 4 | 1.523 |
| 38 | 96 | 580 | 1 | 1.3 | 84 | ◯ | ◯ | 4 | 1.523 |
| 39 | 96 | 478 | 1.2 | 3.8 | 82 | ◯ | ◯ | 4 | 1.523 |
| 40 | 96 | 442 | 1.1 | 1.5 | 82 | ◯ | ◯ | 4 | 1.523 |
| 41 | 96 | 478 | 0.95 | 1.4 | 82 | ◯ | ◯ | 4 | 1.523 |

TABLE 6

| Ex. No. | HL hardness | λ Max (nm) | Color density | Fading rate (min) | Light resistance (%) | Optical distortion | Heat resistance | Impact resistance | Refractive index |
|---|---|---|---|---|---|---|---|---|---|
| 42 | 96 | 574 | 0.8 | 1.2 | 82 | ◯ | ◯ | 4 | 1.523 |
| 43 | 96 | 610 | 0.8 | 0.9 | 88 | ◯ | ◯ | 4 | 1.523 |
| 44 | 96 | 610 | 0.8 | 0.9 | 92 | ◯ | ◯ | 4 | 1.523 |
| 45 | 90 | 610 | 0.9 | 0.8 | 92 | ◯ | ◯ | 4 | 1.53 |
| 46 | 72 | 610 | 0.9 | 0.8 | 92 | ◯ | ◯ | 4 | 1.525 |
| 47 | 96 | 610 | 0.8 | 0.9 | 88 | ◯ | ◯ | 4 | 1.532 |
| 48 | 90 | 610 | 0.95 | 0.68 | 88 | ◯ | ◯ | 4 | 1.523 |
| 49 | 85 | 610 | 0.92 | 0.65 | 88 | ◯ | ◯ | 4 | 1.523 |
| 50 | 82 | 610 | 0.96 | 0.6 | 88 | ◯ | ◯ | 4 | 1.523 |
| 51 | 90 | 610 | 0.92 | 0.7 | 82 | ◯ | ◯ | 4 | 1.523 |
| 52 | 85 | 610 | 0.92 | 0.68 | 82 | ◯ | ◯ | 4 | 1.523 |
| 53 | 82 | 610 | 0.95 | 0.62 | 82 | ◯ | ◯ | 4 | 1.521 |
| 54 | 95 | 610 | 0.8 | 0.9 | 86 | ◯ | ◯ | 4 | 1.531 |
| 55 | 96 | 610 | 0.7 | 2.5 | 84 | ◯ | ◯ | 4 | 1.522 |
| 56 | 96 | 610 | 0.7 | 2.5 | 84 | ◯ | ◯ | 4 | 1.535 |
| 57 | 96 | 610 | 0.8 | 1.2 | 86 | ◯ | ◯ | 4 | 1.581 |
| 58 | 96 | 610 | 0.75 | 0.9 | 86 | ◯ | ◯ | 4 | 1.582 |

Comparative Examples 1 to 19

For the purpose of comparison, photochromic cured products were obtained in the same manner as in Example 1 but using polymerizable monomer compositions and chromene compounds shown in Table 7, and were evaluated for their photochromic properties and base material properties. The results were as shown in Table 8.

TABLE 7

| Ex. No. | Low-hardness monomer (parts by wt) | | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|---|
| 1 | — | | — | | 4G/GMA | 85/9 | α MS/MSD | 5/1 | — | chromene 1 | 0.03 |
| 2 | — | | TMPT | 85 | GMA | 9 | α MS/MSD | 5/1 | — | chromene 1 | 0.03 |
| 3 | MAPEG(526) | 85 | — | | GMA | 15 | — | | — | chromene 1 | 0.03 |
| 4 | — | | — | | 4G/GMA | 85/9 | α MS/MSD | 5/1 | — | chromene 2 | 0.05 |
| 5 | — | | — | | 4G/GMA | 85/15 | — | | — | chromene 3 | 0.05 |
| 6 | — | | — | | 4G/GMA | 85/15 | — | | — | chromene 4 | 0.05 |
| 7 | — | | — | | 4G/GMA | 85/15 | — | | — | chromene 5 | 0.03 |
| 8 | — | | — | | 4G/GMA | 85/15 | — | | — | chromene 6 | 0.03 |
| 9 | — | | — | | 4G/GMA | 85/15 | — | | — | chromene 7 | 0.03 |

TABLE 7-continued

| Ex. No. | Low-hardness monomer (parts by wt) | High-hardness monomer 1 (parts by wt) | | High-hardness monomer 2 (parts by wt) | | Arbitrary monomer (parts by wt) | | Other additives (parts) | Chromene compound (parts) | |
|---|---|---|---|---|---|---|---|---|---|---|
| 10 | — | | — | 4G | 100 | — | | — | chromene 8 | 0.03 |
| 11 | — | | — | 4G/GMA | 85/9 | αMS/MSD | 5/1 | — | chromene 8 | 0.03 |
| 12 | MAPEG(526) 100 | | — | — | | — | | — | chromene 8 | 0.03 |
| 13 | — | TMPT | 100 | — | | — | | — | chromene 8 | 0.03 |
| 14 | MAPEG(526) 10 | TMPT | 90 | — | | — | | — | chromene 8 | 0.03 |
| 15 | MAPEG(526) 10 | | — | 4G | 90 | — | | — | chromene 8 | 0.03 |
| 16 | — | TMPT | 20 | 4G | 80 | — | | — | chromene 8 | 0.03 |
| 17 | MAPEG(526) 10 | | — | BPE/4G | 40/50 | — | | — | chromene 8 | 0.03 |
| 18 | SR9036 40 | BPE | 60 | — | | — | | — | chromene 8 | 0.03 |
| 19 | SR9036 40 | BPE/TMPT | 40/20 | — | | — | | — | chromene 8 | 0.03 |

TABLE 8

| Ex. No. | HL hardness | λ Max (nm) | Color density | Fading rate (min) | Light resistance (%) | Optical distortion | Heat resistance | Impact resistance | Refractive index |
|---|---|---|---|---|---|---|---|---|---|
| 1 | 95 | 584 | 0.5 | 4.6 | 82 | ○ | ○ | 5 | 1.523 |
| 2 | 120 | 582 | 0.9 | 1.5 | 82 | X | X | 1 | 1.523 |
| 3 | <10 | 584 | 1.1 | 1 | 82 | X | X | 5 | 1.51 |
| 4 | 95 | 584 | 0.3 | 2 | 86 | ○ | ○ | 5 | 1.523 |
| 5 | 95 | 584 | 0.4 | 4 | 78 | X | ○ | 5 | 1.518 |
| 6 | 95 | 478 | 1 | 6 | 82 | X | ○ | 5 | 1.518 |
| 7 | 95 | 442 | 1 | 3 | 80 | X | ○ | 5 | 1.518 |
| 8 | 95 | 478 | 1 | 3 | 84 | X | ○ | 5 | 1.518 |
| 9 | 95 | 574 | 0.3 | 5.5 | 81 | X | ○ | 5 | 1.518 |
| 10 | 90 | 610 | 0.4 | 6 | 68 | X | ○ | 2 | 1.518 |
| 11 | 95 | 610 | 0.4 | 6 | 88 | ○ | ○ | 5 | 1.523 |
| 12 | <30 | 610 | 1 | 0.5 | 50 | ○ | X | 5 | 1.518 |
| 13 | 122 | 610 | 0.8 | 0.6 | 50 | X | X | 1 | 1.518 |
| 14 | 110 | 610 | 0.8 | 0.9 | 50 | X | X | 2 | 1.518 |
| 15 | 65 | 610 | 0.7 | 1.5 | 69 | X | X | 4 | 1.518 |
| 16 | 115 | 610 | 0.6 | 1.5 | 69 | X | ○ | 2 | 1.518 |
| 17 | 50 | 610 | 0.8 | 1.5 | 69 | ○ | X | 2 | 1.54 |
| 18 | 30 | 610 | 0.75 | 1.5 | 68 | X | X | 4 | 1.55 |
| 19 | 70 | 610 | 0.75 | 3.5 | 70 | X | ○ | 4 | 1.54 |

Example 58

0.3 Parts by weight of the chromene 1 and 1 part by weight of the perbutyl ND as the polymerization initiator, were added to 100 parts by weight of polymerizable monomers comprising 20 parts by weight of TMPT, 55 parts by weight of tetraethylene glycol dimethacrylate, 7 parts by weight of glycidyl methacrylate, 5 parts by weight of αMS, 1 part by weight of MSD and 12 parts by weight of MAPEG 526, and were mixed to a sufficient degree. This mixture solution was poured into a mold constituted by an ADC resin plate (1.5 mm thick), a glass plate and a gasket of an ethylene/vinyl acetate copolymer, and was cast-polymerized. The polymerization was conducted by using an air furnace while gradually raising the temperature from 30° C. to 90° C. over a period of 18 hours and maintaining the temperature at 90° C. for 2 hours. After the polymerization has been finished, the polymer was removed from the glass mold. There was obtained the polymer (2.0 mm thick) having a photochromic layer of a thickness of 0.5 mm formed on one surface thereof. The polymer was evaluated for its photochromic properties and base member properties by the same methods as those of Example 1. The results were as shown in Table 5.

TABLE 9

| Ex. No. | Low-hardness monomer (parts by wt) | High-hardness monomer 1 (parts by wt) | High-hardness monomer 2 (parts by wt) | Arbitrary monomer (parts by wt) | Other additives (parts) | Chromene compound (parts) | λ max (nm) | Color density | Fading rate (min) | Light resistance (%) |
|---|---|---|---|---|---|---|---|---|---|---|
| 58 | MAPEG (526) 5 | TMPT 20 | 4G/GMA 57/7 | αMS/MSD 5/1 | — | chromene 1 0.3 | 586 | 0.6 | 2 | 78 |

As described above, the base member obtained from a polymerizable monomer having HL of not higher than 40 exhibits excellent photochromic properties but is not practicable because of its low heat resistance. The matrix obtained from a polymerizable monomer having HL of not smaller than 60 exhibits practicable substrate characteristics but insufficient photochromic properties. Both properties, i.e., photochromatic properties and matrix properties, are satisfied by using a polymerizable monomer having HL of not higher than 40, a difunctional polymerizable monomer having HL of not smaller than 60, and a difunctional polymerizable monomer having HL of not smaller than 60 in combination. Photochromic cured products of Examples 1 to 58 of the present invention exhibit well-balanced photochromic properties such as color density, fading rate and hardness, as well as impact resistance and heat resistance which are properties of the matrix.

INDUSTRIAL APPLICABILITY

The photochromic cured product of the present invention exhibits excellent photochromic properties such as a high color density and a large fading rate, and exhibits excellent base member properties such as a high hardness, a high heat resistance and a high impact resistance.

Therefore, the cured product obtained from the photochromic composition of the present invention is very useful as an optical material such as a photochromic lens material.

The invention claimed is:
1. A curable composition which, when cured, exhibits an L-scale Rockwell hardness of not smaller than 60, comprising:
A) a polymerizable monomer which, when homopolymerized, exhibits the L-scale Rockwell hardness of not larger than 40, the polymerizable monomer A) being represented by the following formula (2):

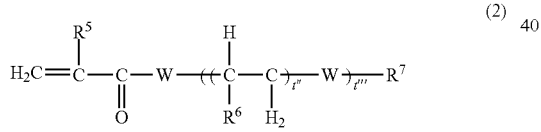

wherein $R^5$ and $R^6$ are, independently from each other, hydrogen atoms or alkyl groups having 1 to 2 carbon atoms,
$R^7$ is a hydrogen atom, an alkyl group, an alkoxyalkyl group, an aryl group, an acyl group, an alkyl group having an epoxy group at the terminal, a methacryloyl group, an acryloyl group, a haloalkyl group or an oleyl group,
W is an oxygen atom or a sulfur atom,
t" is an integer of 2 to 8,
t''' is 7 to 40 when $R^5$ is an alkyl group and $R^7$ is a methacryloyl group,
t''' is 4 to 40 when $R^5$ is an alkyl group and $R^7$ is a group other than the methacryloyl group and the acryloyl group, and
t''' is 1 to 40 when $R^5$ is a hydrogen atom;
B) a polyfunctional polymerizable monomer which has three or more radically polymerizable groups and which, when homopolymerized, exhibits the L-scale Rockwell hardness of not smaller than 60, the polyfunctional polymerizable monomer B) being selected from a group consisting of trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropanetriethylene glycol trimethacrylate, trimethylolpropanetriethylene glycol triacrylate, ethoxylated pentaerythritol tetraacrylate, ethoxylated pentaerythritol tetramethacrylate, pentaerythritol trimethacrylate, pentaerythritol tetramethacrylate, urethaneoligomer tetramethacrylate, urethaneoligomer tetraacrylate, and urethaneoligomer hexamethacrylate;
C) a difunctional polymerizable monomer which has two radically polymerizable groups and which, when homopolymerized, exhibits the L-scale Rockwell hardness of not smaller than 60, the difunctional polymerizable monomer C) being selected from a group consisting of diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, bisphenol A dimethacrylate, 2,2-bis(4-methacryloyloxyethoxyphenyl)propane, 2,2-bis(3,5-dibromo-4-methacryloyloxyethoxyphenyl)propane, and bis(2-methacryloyloxyethylthioethyl)sulfide; and
D) a photochromic compound having a molecular weight of not smaller than 540, the photochromic compound D) being contained in an amount of from 0.001 to 5 parts by weight per 100 parts by weight of the whole polymerizable monomers;
wherein, on the basis of the total mass of the components (A), (B) and (C),
the content of the component (A) is from 1 to 50% by mass;
the total mass of the components (B) and (C) is from 50 to 99% by mass;
and on the basis of the total mass of the components (B) and (C),
the content of the component (B) is from 2 to 50% by mass; and
the content of the component (C) is from 50 to 98% by mass.
2. A curable composition according to claim 1, wherein the photochromic compound is represented by the following general formula (10),

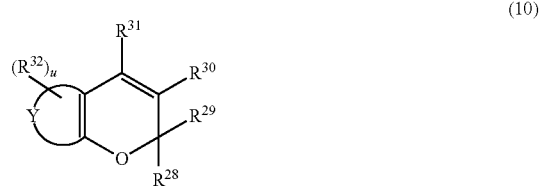

wherein a ring represented by the following general formula (11)

is an aromatic hydrocarbon ring, or an unsaturated heterocyclic ring, $R^{30}$, $R^{31}$ and $R^{32}$ are hydrogen atoms, alkyl groups, alkoxy groups, aralkoxy groups, amino groups, substituted amino groups, cyano groups, substituted or unsubstituted aryl groups, halogen atoms, aralkyl groups, hydroxy groups, substituted or unsubstituted alkynyl groups, substituted or unsubstituted heterocyclic groups containing a nitrogen atom as a hetero atom and in which the nitrogen atom is bonded to a pyran ring or to the ring represented by the above formula (11), or condensed heterocyclic groups in which the heterocyclic group is condensed with an aromatic hydrocarbon ring or an aromatic heterocyclic ring, u is an integer of 0 to 6, $R^{28}$ and $R^{29}$ are, independently from each other, groups represented by the following formula (12),

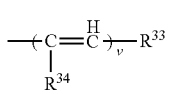
(12)

wherein $R^{33}$ is a substituted or unsubstituted aryl group, or substituted or unsubstituted heteroaryl group, $R^{34}$ is a hydrogen atom, an alkyl group or a halogen atom, and v is an integer of 1 to 3, a group represented by the following formula (13),

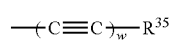
(13)

$R^{35}$ (13)

wherein $R^{35}$ is a substituted or unsubstituted aryl group, or a substituted or unsubstituted heteroaryl group, and w is an integer of 1 to 3, a substituted or unsubstituted aryl group, a substituted or unsubstituted heteroaryl group or, alkyl group, or $R^{28}$ and $R^{29}$ together may constitute an aliphatic hydrocarbon ring or an aromatic hydrocarbon ring.

3. A curable composition according to claim 1, wherein in the general formula (2), t''' is 8 to 10 when $R^5$ is an alkyl group and $R^7$ is a methacryloyl group, t''' is 4 to 23 when $R^5$ is an alkyl group and $R^7$ is a group other than the methacryloyl group and the acryloyl group, and t''' is 1 to 10 when $R^5$ is a hydrogen atom.

4. A curable composition according to claim 1 which further contains a polymerizable monomer having at least one epoxy group as other polymerizable monomer than the components (A), (B) and (C), in an amount of from 0.01 to 40% by mass.

5. A curable composition according to claim 4, wherein the polymerizable epoxy monomer represented by the following general formula (9),

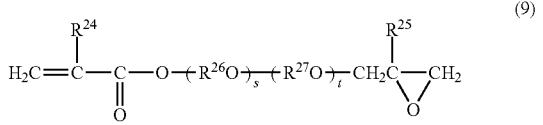
(9)

wherein $R^{24}$ and $R^{25}$ are, independently from each other, hydrogen atoms or methyl groups, $R^{26}$ and $R^{27}$ are, independently from each other, alkylene groups which may be substituted by a hydroxy group and having 1 to 4 carbon atoms, or groups represented by the formula

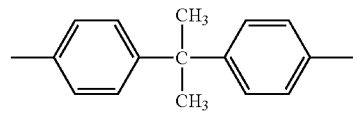

and s and t are, respectively, 0 to 20 in average.

6. A curable composition according to claim 5, wherein the polymerizable epoxy monomer is glycidyl methacrylate.

7. A curable composition according to claim 1, comprising:
the polymerizable monomer A) comprising polyethylene glycol methacrylate;
the polyfunctional polymerizable monomer B) comprising trimethylolpropane trimethacrylate; and
the difunctional polymerizable monomer C) comprising tetraethylene glycol dimethacrylate.

8. A curable composition according to claim 1, consisting of:
the polymerizable monomer A);
the polyfunctional polymerizable monomer B);
the difunctional polymerizable monomer C);
the photochromic compound D); and optionally
a polymerizable monomer having at least one epoxy group as other polymerizable monomer than the components A), B), and C), in an amount of from 0.01 to 40% by weight of the whole polymerizable monomers; and optionally
a surfactant, antioxidant, radical-trapping agent, ultraviolet stabilizer, ultraviolet absorber, parting agent, coloring-preventing agent, antistatic agent, dye, fluorescent dye, pigment, perfume, or combinations thereof.

9. The curable composition according to claim 1, wherein the polymerizable monomer A) is selected from a group consisting of polyethylene glycol methacrylate, methyl ether polyethylene glycol methacrylate, polypropylene glycol methacrylate, methyl ether polypropylene glycol methacrylate, methyl ether polyethylene glycol polypropylene glycol methacrylate, polytetramethylene glycol methacrylate, octylphenyl ether polyethylene glycol methacrylate, nonyl ether polyethylene glycol methacrylate, methoxyethyl acrylate, methyl ether polyethylene glycol acrylate, methyl ether polyethylene glycol polypropylene glycol acrylate, methylthio ether polyethylenethio glycol methacrylate, perfluoroheptylethylene glycol methacrylate, glycidyl polyethylene glycol methacrylate, acetyloxyethyl acrylate, phenoxyethyl acrylate, benzyloxyethyl acrylate, acetylpolyethylene glycol methacrylate, butylylpolyethylene glycol methacrylate, benzoylpolyethylene glycol methacrylate, nonylbenzoylpolyethylene glycol methacrylate, butoxymethyl ether polyethylene glycol methacrylate, polyethylene glycol dimethacrylate, polytetramethylene glycol dimethacrylate, polypropylene glycol dimethacrylate, polyethylene glycol diacrylate, and polyethylene glycol methacrylate acrylate.

10. The curable composition according to claim 1, wherein the polymerizable monomer A) is selected from a group consisting of polyethylene glycol methacrylate, polypropylene glycol methacrylate, methyl ether polyethylene glycol methacrylate, octylphenyl ether polyethylene glycol methacrylate, perfluoroheptylethylene glycol methacrylate, acetylpolyethylene glycol methacrylate, polyethylene glycol diacrylate, methyl ether polyethylene glycol acrylate, and methylthio ether polyethylenethio glycol methacrylate.

11. The curable composition according to claim 10, wherein the polyfunctional polymerizable monomer B) is selected from a group consisting of trimethylolpropane trimethacrylate, ethoxylated pentaerythritol tetraacrylate, pentaerythritol trimethacrylate, pentaerythritol tetramethacrylate, urethaneoligomer tetraacrylate, and urethaneoligomer tetramethacrylate.

12. The curable composition according to claim 11, wherein the difunctional polymerizable monomer C) is selected from a group consisting of triethylene glycol dimethacrylate, tetraethylene glycol dimethacrylate, tetrapropylene glycol dimethacrylate, and 2,2-bis(4-methacryloyloxyethoxyphenyl)propane.

13. The curable composition according to claim 1, wherein the polymerizable monomer A) is selected from a group consisting of polyethylene glycol methacrylate and methyl ether polyethylene glycol methacrylate.

14. The curable composition according to claim 13, wherein the polyfunctional polymerizable monomer B) is selected from a group consisting of trimethylolpropane trimethacrylate, pentaerythritol trimethacrylate, and pentaerythritol tetramethacrylate.

15. The curable composition according to claim 14, wherein the difunctional polymerizable monomer C) is selected from a group consisting of triethylene glycol dimethacrylate, tetraethylene glycol dimethacrylate, and 2,2-bis(4-methacryloyloxyethoxyphenyl)propane.

* * * * *